United States Patent
Register et al.

(10) Patent No.: US 10,051,006 B2
(45) Date of Patent: *Aug. 14, 2018

(54) LATENCY-BASED TIMEOUTS FOR CONCURRENT SECURITY PROCESSING OF NETWORK PACKETS BY MULTIPLE IN-LINE NETWORK SECURITY TOOLS

(71) Applicant: IXIA, Calabasas, CA (US)

(72) Inventors: Scott Register, Austin, TX (US); Shardendu Pandey, Cedar Park, TX (US); Glenn Chagnot, Southlake, TX (US); Deepesh Arora, Austin, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,125

(22) Filed: May 5, 2016

(65) Prior Publication Data

US 2017/0324778 A1    Nov. 9, 2017

(51) Int. Cl.
*H04L 29/06* (2006.01)
*H04L 12/26* (2006.01)

(52) U.S. Cl.
CPC .......... *H04L 63/20* (2013.01); *H04L 43/0864* (2013.01); *H04L 43/106* (2013.01); *H04L 43/16* (2013.01)

(58) Field of Classification Search
CPC ..................... H04L 43/12; H04L 43/16; H04L 43/0852–43/087; H04L 43/106; H04L 63/20
See application file for complete search history.

(56) References Cited

U.S. PATENT DOCUMENTS

| | | |
|---|---|---|
| 5,600,632 A | 2/1997 | Schulman |
| 6,775,657 B1 | 8/2004 | Baker |
| 6,954,775 B1 | 10/2005 | Shanklin et al. |

(Continued)

OTHER PUBLICATIONS

Patent Application, Register et al, "Concurrent Security Processing of Network Packets by Multiple In-Line Network Security Tools," U.S. Appl. No. 15/147,174, filed May 5, 2016, 55 pgs.

(Continued)

*Primary Examiner* — Pao Sinkantarakorn
*Assistant Examiner* — Kabir Jahangir

(57) ABSTRACT

Latency-based timeouts are used for concurrent security processing by multiple in-line network security tools. A network system forwards secure network packets to the tools and uses latency-based timeouts with respect to the return of processed packets from the tools. Initially, the network system measures processing latencies for the tools and sets at least one timeout threshold based upon the processing latencies. The network system then receives an input packet from a network source, generates a timestamp, concurrently sends an output packet to the tools based upon the input packet, tracks return packets from the tools, and determines whether a timeout has occurred with respect to the timeout threshold based upon a difference between the timestamp and a current timestamp. If a timeout does not occur, a secure packet is forwarded to a network destination. If a timeout does occur, return packet tracking for the input packet is ended.

22 Claims, 16 Drawing Sheets

(56) References Cited

U.S. PATENT DOCUMENTS

| | | | |
|---|---|---|---|
| 8,018,943 B1* | 9/2011 | Pleshek | H04L 43/028 |
| | | | 370/254 |
| 2002/0194319 A1 | 12/2002 | Ritche | |
| 2004/0073800 A1 | 4/2004 | Shah et al. | |
| 2004/0215972 A1 | 10/2004 | Sung et al. | |

OTHER PUBLICATIONS

Office Action dated Jan. 11, 2018, from Register et al., "Concurrent Security Processing of Network Packets by Multiple In-Line Network Security Tools", U.S. Appl. No. 15/147,174, filed May 5, 2016, 12 pgs.

\* cited by examiner

LATENCY-BASED TIMEOUTS FOR CONCURRENT SECURITY PROCESSING OF NETWORK PACKETS BY MULTIPLE IN-LINE NETWORK SECURITY TOOLS

RELATED APPLICATIONS

This application is related in subject matter to the following concurrently filed application: U.S. patent application Ser. No. 15/147,174, entitled "CONCURRENT SECURITY PROCESSING OF NETWORK PACKETS BY MULTIPLE IN-LINE NETWORK SECURITY TOOLS," which is hereby incorporated by reference in its entirety.

TECHNICAL FIELD OF THE INVENTION

This invention relates to managing network packets for processing by multiple in-line network security tools within network packet communication systems.

BACKGROUND

Packet-based data networks continue to grow in importance, and it is often desirable to implement real-time security monitoring for network traffic associated with these packet-based networks. In addition, it is often desirable to apply a variety of different security tests to the packet traffic within the packet network communication system. To meet these various security monitoring and test needs, many network communication systems serially scan packets using multiple in-line network security tools prior to deeming input packets safe or secure enough to be forwarded on to network destinations. For these prior solutions, input packets from network sources are sent through a series of in-line network security tools prior to being forwarding on as secure or safe packets to network destinations.

FIG. 1 (Prior Art) is a block diagram of an example embodiment 100 for a network communication system including a network packet forwarding system 110 that serially forwards incoming network packets 104 from network packet sources 102 through a series of in-line security tools (TOOL1, TOOL2, TOOL3) 112, 114, and 116 before providing secure network packets 106 to network packet destinations 108. In particular, when each input packet is received, the packet forwarding system 110 forwards the input packet to a first security tool (TOOL 1) 112 as indicated by arrow 120. The first security tool 112 processes the packet according to its internal security processing procedures and returns the packet to the network packet forwarding system 110 as indicated by arrow 122, assuming that the packet is not blocked or dropped by the first security tool 112, for example, because it has been deemed an insecure packet by the first security tool 112. The packet forwarding system 110 then forwards the input packet to a second security tool (TOOL 2) 114 as indicated by arrow 124. Similar to the first security tool 112, the second security tool 114 processes the packet according to its internal security processing procedures and returns the packet to the network packet forwarding system 110 as indicated by arrow 126, assuming again that the packet is not blocked or dropped by the second security tool 114, for example, because it has been deemed an insecure packet by the second security tool 114. The packet forwarding system 110 then forwards the input packet to a third security tool (TOOL 3) 116 as indicated by arrow 128. Similar to the other security tools 112 and 114, the third security tool 116 processes the packet according to its internal security processing procedures and returns the packet to the network packet forwarding system 110 as indicated by arrow 130, assuming again that the packet is not blocked or dropped by the third security tool 116, for example, because it has been deemed an insecure packet by the third security tool 116. After the last security tool 116 returns the packet, the network packet forwarding system 110 forwards the packet as a secure network packet to one or more of the network packet destinations 108.

Thus, for the example embodiment 100 that includes three security tools, a series of six communications 120, 122, 124, 126, 128, and 130 are used to pass each input packet in sequence to the different security tools 112, 114, and 116 for processing. The overall latency for this security processing, therefore, is the sum of the individual processing latencies for the security tools 112, 114, and 116 plus the latencies for four processing hops through the network packet forwarding system 110 itself as represented by dashed lines 132, 134, 136, and 138. This latency can become significant, depending upon the combined latencies of the different security tools, particularly where the number and/or complexity of the security tools is increased for a particular network communication system.

SUMMARY OF THE INVENTION

Systems and methods are disclosed that use latency-based timeouts for concurrent security processing by multiple in-line network security tools. For disclosed embodiments, a network system forwards secure network packets to a plurality of network security tools and uses latency-based timeouts with respect to the return of processed packets from these network security tools. The network system measures processing latencies for the plurality of network security tools and sets at least one timeout threshold based upon the processing latencies. The network system then receives an input packet from a network source, generates a timestamp associated with the input packet, concurrently sends an output packet to the plurality of network security tools where the output packet is based upon the input packet, tracks return packets from the plurality of network security tools where the return packets being associated with the input packet, and determines whether a timeout has occurred with respect to the timeout threshold based upon a difference between the timestamp and a current timestamp. If a timeout does not occur before return packets have been received from each of the network security tools, the network system forwards a secure packet to a network destination where the secure packet is based upon at least one of the return packets. If a timeout does occur before return packets have been received from each of the plurality of network security tools, the network system ends the tracking of return packets for the input packet. Other features and variations can be implemented, if desired, and related systems and methods can also be utilized.

For one embodiment, a method to forward secure network packets to a plurality of network security tools coupled to a network system is disclosed including measuring processing latencies for the plurality of network security tools, setting at least one timeout threshold based upon the processing latencies, receiving an input packet from a network source, generating a timestamp associated with the input packet, concurrently sending an output packet to the plurality of network security tools, the output packet being based upon the input packet, tracking return packets from the plurality of network security tools, the return packets being associated with the input packet, and determining whether a timeout has occurred with respect to the at least one timeout threshold based upon a difference between the timestamp and a current timestamp. If a timeout does not occur before return packets have been received from each of the plurality of network security tools, a secure packet is forwarded to a network destination, the secure packet being based upon at least one of the return packets. If a timeout does occur before return packets have been received from each of the plurality of network security tools, the tracking of return packets for the input packet is ended.

In additional embodiments, the measuring processing latencies includes forwarding one or more test packets to the plurality of network security tools. In further embodiments, the measuring, for each of the plurality of network security tools, includes generating a timestamp for a test packet, forwarding a test packet to the network security tool, receiving a return test packet from the network security tool where the return test packet is based upon the test packet, generating a return timestamp for the return test packet, and determining a processing latency for the network security tool based upon a difference between the timestamp and the return timestamp. In still further embodiments, the method also includes repeating the measuring a plurality of times to generate a plurality of processing latencies for each network security tool and using the plurality of processing latencies to set the at least one timeout threshold. In additional further embodiments, the method also includes determining an average processing latency based upon the plurality of processing latencies and using the average processing latency to set the at least one timeout threshold. In other additional embodiments, the method also includes setting a different timeout threshold for each of the network security tools based upon the processing latencies.

In additional embodiments, the method includes generating a hash value based upon the input packet and storing the timestamp and the hash value in an entry for the input packet within a hash table. In further embodiments, the method also includes generating a return hash value for each return packet and comparing the return hash value to the hash table to obtain the timestamp for the input packet. In still further embodiments, the method also includes generating a return timestamp for each return packet and using a difference between the timestamp and the return timestamp to determine a processing latency for each return packet. In additional further embodiments, the method includes setting the at least one timeout threshold based upon processing latencies for a plurality of return packets. Still further, the method can also include setting a different timeout threshold for each of the network security tools.

For one embodiment, a network system to forward secure network packets to a plurality of network security tools coupled to the network system is disclosed including a source port configured to receive an input packet from a network source, a plurality of tool ports, a destination port, a timestamp generator, and one or more programmable integrated circuits. The plurality of tool ports are configured to transmit an output packet to a plurality of network security tools and to receive return packets from the plurality of network security tools where the output packet is based upon the input packet and the return packets is based upon the output packet. The destination port is configured to forward a secure packet to a network destination where the secure packet is based upon at least one of the return packets. The one or more programmable integrated circuits are programmed to receive the input packet through the source port, set at least one timeout threshold based upon processing latencies for the plurality of network security tools, obtain a timestamp from the timestamp generator for the input packet, send the output packet concurrently to the plurality of network security tools through the tool ports, track the return packets from the tool ports, and determine whether a timeout has occurred with respect to the at least one timeout threshold based upon a difference between the timestamp and a current timestamp. And the one or more programmable integrated circuits are further programmed to, if a timeout does not occur before return packets have been received from each of the plurality of network security tools, forward a secure packet to a network destination through the destination port, the secure packet being based upon at least one of the return packets, and if a timeout does occur before return packets have been received from each of the plurality of network security tools, end tracking of return packets for the input packet.

In additional embodiments, the one or more programmable integrated circuits are further programmed to measure processing latencies based upon test packets forwarded to the plurality of network security tools. In further embodiments, to measure processing latency for each of the plurality of network security tools, the one or more programmable integrated circuits are programmed to generate a timestamp for a test packet, forward a test packet to the network security tool, receive a return test packet from the network security tool, the return test packet being based upon the test packet, generate a return timestamp for the return test packet, and determine a processing latency for the network security tool based upon a difference between the timestamp and the return timestamp. In still further embodiments, the one or more programmable integrated circuits are further programmed to measure a plurality of processing latencies for each network security tool and to use the plurality of processing latencies to set the at least one timeout threshold. In additional further embodiments, the at least one timeout threshold is based upon an average processing latency determined from the plurality of processing latencies. In other additional embodiments, the one or more programmable integrated circuits are programmed to set a different timeout threshold for each of the network security tools based upon the processing latencies.

In additional embodiments, the network system also includes a hash generator configured to generate a hash value based upon the input packet, and the one or more programmable integrated circuits are programmed to store the timestamp and the hash value in an entry for the input packet within a hash table. In further embodiments, the network system also includes a return hash generator configured to generate a return hash value for each return packet, and the one or more programmable integrated circuits are programmed to compare the return hash value to the hash table to obtain the timestamp for the input packet. In still further embodiments, the one or more programmable integrated circuits are programmed to use a difference between the timestamp and a return timestamp to determine a processing latency for each return packet. In additional further embodiments, the at least one timeout threshold is based upon processing latencies for a plurality of return packets. Still further, the one or more programmable integrated circuits can be programmed to set a different timeout threshold for each of the network security tools.

Different or additional features, variations, and embodiments can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Network packet forwarding systems and methods are disclosed that use latency-based timeouts for concurrent security processing by multiple in-line network security tools. For disclosed embodiments, a network packet forwarding system forwards secure network packets to a plurality of network security tools and uses latency-based timeouts with respect to the return of processed packets from these network security tools. The network system measures processing latencies for the plurality of network security tools and sets at least one timeout threshold based upon the processing latencies. The network system then receives an input packet from a network source, generates a timestamp associated with the input packet, concurrently sends an output packet to the plurality of network security tools where the output packet is based upon the input packet, tracks return packets from the plurality of network security tools where the return packets being associated with the input packet, and determines whether a timeout has occurred with respect to the timeout threshold based upon a difference between the timestamp and a current timestamp. If a timeout does not occur before return packets have been received from each of the network security tools, the network system forwards a secure packet to a network destination where the secure packet is based upon at least one of the return packets. If a timeout does occur before return packets have been received from each of the plurality of network security tools, the network system ends the tracking of return packets for the input packet. Different features and variations can be implemented, as desired, and related systems and methods can be utilized, as well.

Figure 2A:
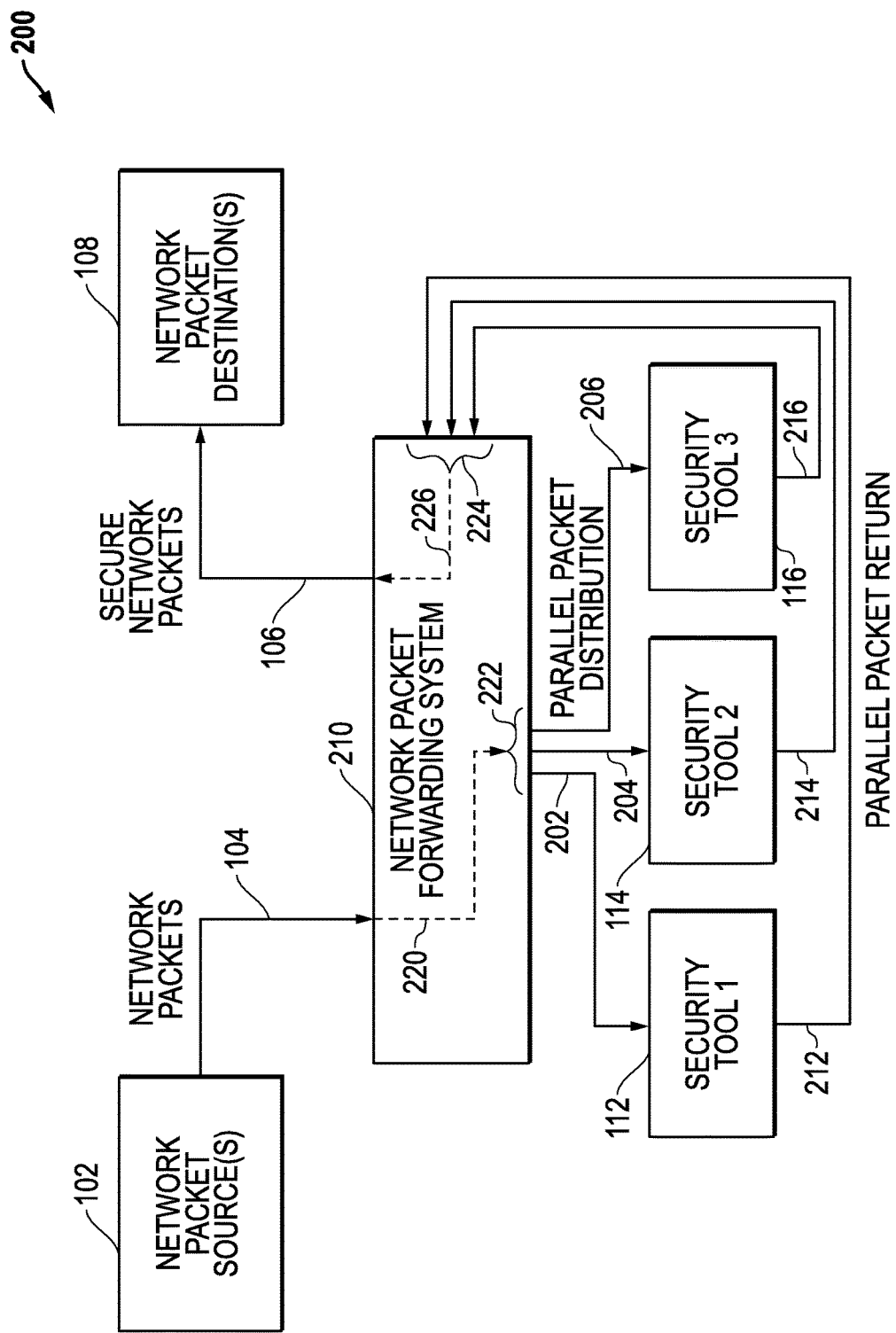
FIG. 2A is a block diagram of an example embodiment for a network communication system including a network packet forwarding system that provides rapid concurrent, parallel distribution and related processing of incoming network packets from network packet sources with respect to multiple in-line security tools.

FIG. 2A is a block diagram of an example embodiment 200 for a network communication system including a network packet forwarding system 210 that provides rapid concurrent, parallel distribution and related processing of incoming network packets 104 from network packet sources 102 with respect to multiple in-line security tools (TOOL 1, TOOL 2, TOOL 3) 112, 114, and 116. The network packet forwarding system 210 thereby outputs secure network packets 106 to network packet destinations 108 with significantly reduced latency as compared to prior solutions. In particular, when each input packet is received, the packet forwarding system 210 forwards the input packet to each of the security tools 112 through a concurrent, parallel distribution as represented by bracket 222. As such, the first security tool (TOOL 1) 112, the second security tool (TOOL 2) 114, the third security tool (TOOL 3) 116 concurrently receive the input packet in parallel communications as represented by arrows 202, 204, and 206, respectively. Each of the security tools 112, 114, and 116 then processes the packet according to its internal security processing procedures and returns the processed packet to the network packet forwarding system 210 in parallel communications as represented by arrows 212, 214, and 216, respectively, assuming that the packet is not blocked or dropped by the respective security tool 112. The network packet forwarding system 210 monitors and tracks the return packets from the security tools 112, 114, and 116. As described in further detail below, where one or more of the security tools 112, 114, and 116 are configured to return potentially modified packets, the packet forwarding system 210 can also be configured to identify and track these modifications. Once a return packet has been received by the network packet forwarding system 210 from each of the security tools 112, 114, and 116, the network packet forwarding system 210 resolves any packet modifications and then forwards the final packet as a secure network packet to one or more of the network packet destinations 108. It is noted that while three security tools are shown for the example embodiments herein, it is understood that any number of security tools greater than two security tools could be used within the network communication systems. It is further noted, as described in more detail below, that a tool mask can be used to select which security tools receive the input packet and/or the timing of when different groups of security tools receive the input packet.

Figure 1:
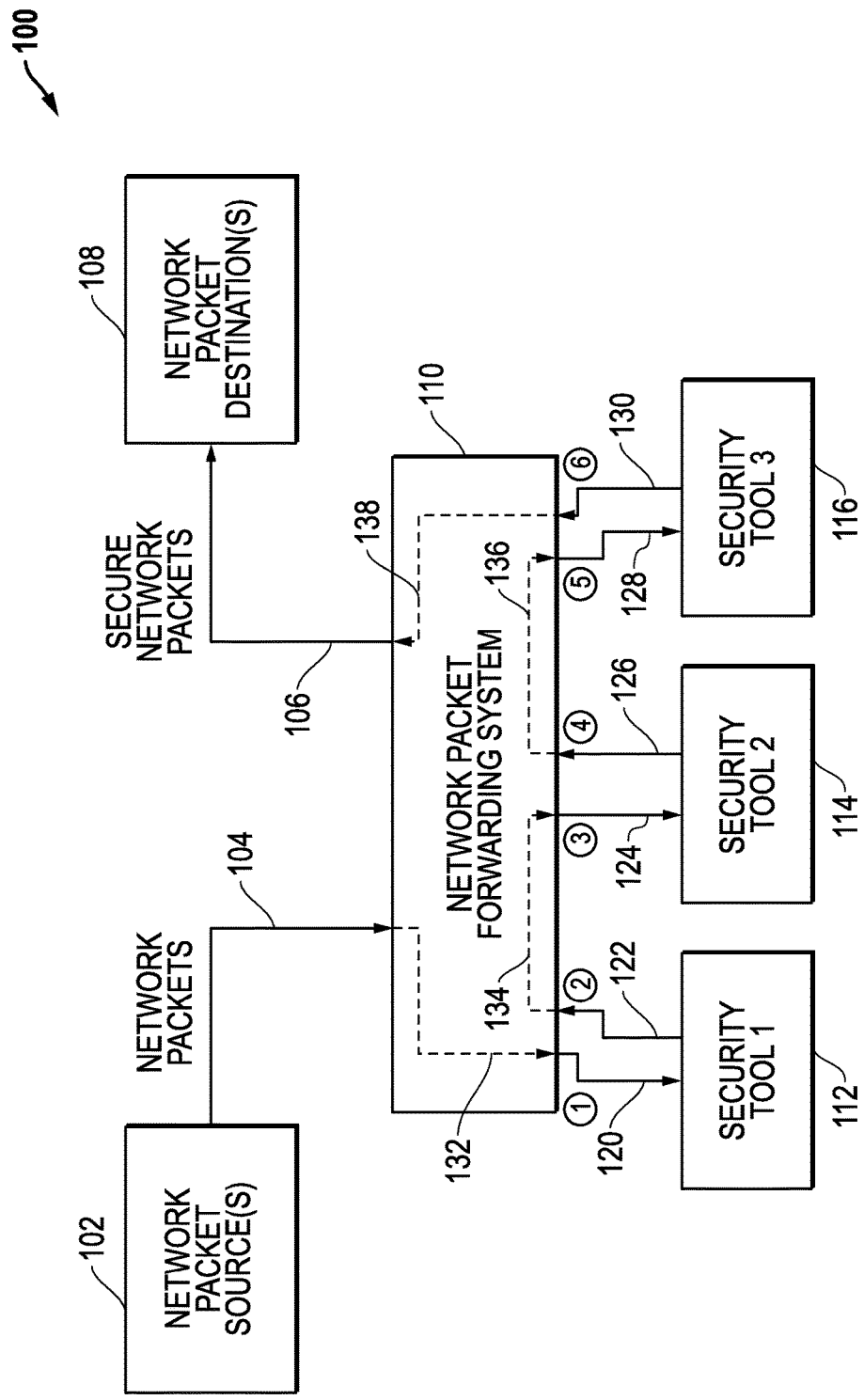
FIG. 1 (Prior Art) is a block diagram of an example embodiment for a network communication system including a network packet forwarding system that serially forwards incoming network packets from network packet sources through a series of in-line security tools before providing secure network packets to network packet destinations.

For the example embodiment 200 that includes three security tools, three concurrent, parallel communications 202, 204, and 206 are used to send the input packet or a version of the input packet to the different security tools 112, 114, and 116 for security processing. Because each of the security tools 112, 114, and 116 receives the input packet in concurrent communications, each security tool 112, 114, and 116 can perform its internal security processing without having to wait on the results of security processing by the other security tools. Thus, the overall latency for the distributed security processing described herein becomes dependent only upon the latency of the slowest security tool 112, 114, and 116 along with the latencies for two processing hops through the network packet forwarding system 210 itself as represented by dashed lines 220 and 226. This resulting latency, therefore, is greatly reduced as compared to the summed latencies for the prior serial processing solutions of FIG. 1 (Prior Art). Further, the latency for embodiment 250 remains dependent only upon the longest processing latency for the security tools 112, 114, and 116 regardless of the number and/or combined complexities of the security tools. As such, the number and/or complexity of the security tools can be increased for a particular network communication system without degrading the overall system performance and/or user experience.

It is noted that the network packet sources 102 and network packet destinations 108 can include any of a wide variety of systems that are connected within a network communication system. These systems can include server systems, data storage systems, desktop computer systems, portable computer systems, network switches, broadband routers, network TAPs (test access ports), network SPAN (switched port analyzer) ports, and/or any other desired network connected systems or devices that communicate network packets. It is further noted that any number of security tools, such as security tools 112, 114, and 116, can be connected to the packet forwarding system 210, and these security tools can be any of a wide variety of network related security tools including traffic monitors, packet sniffers, data recorders, voice-over-IP monitors, intrusion detection systems, network security systems, application monitors and/or any other desired network security tool. Still further, as described herein, the network sources 102, the network destinations 108, the network packet forwarding system 210, and/or the network security tools 112/114/116 can be implemented in whole or in part as virtual machine platforms or instances within virtual processing environments. It is further noted that the network communications can be based upon any desired protocol or combination of packet communication protocols including Ethernet protocols, multi-protocol label switching (MPLS) protocols, FibreChannel (FC) protocols and/or any other desired communication protocols for packet-based network communications.

Figure 2B:
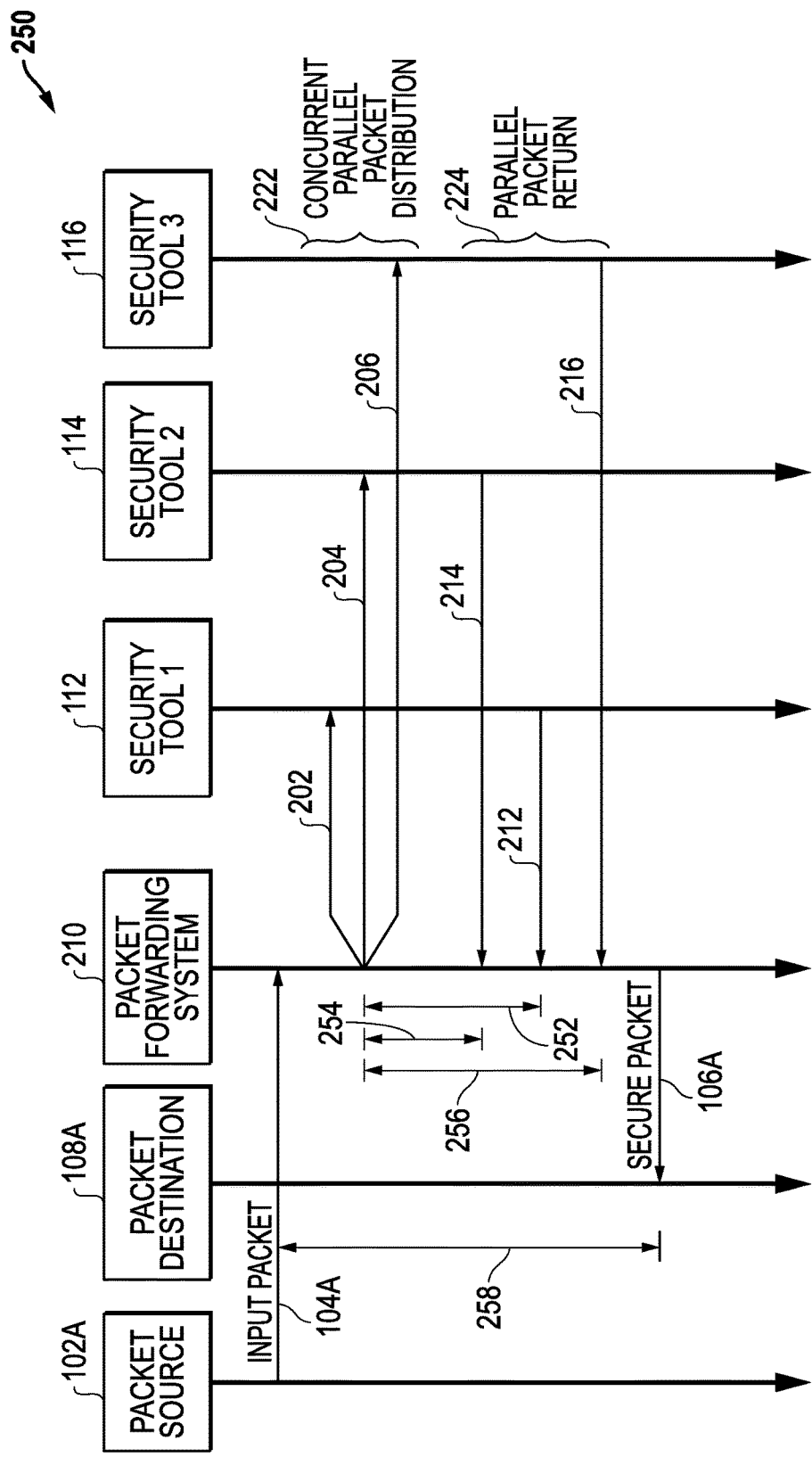
FIG. 2B is a diagram of an embodiment for an example timing sequence for packet communications associated with FIG. 2A.

FIG. 2B is a diagram of an embodiment 250 for an example timing sequence for packet communications associated with FIG. 2A. A packet source 102A first sends an input packet 104A that is received by the packet forwarding system 210. The packet forwarding system 210 than concurrently communicates an output packet based upon the original input packet 104A to the security tools 112, 114, and 116 as represented by packet communications 202, 204, and 206. This concurrent parallel packet distribution 222 allows each of the security tools 112, 114, and 116 to provide concurrent processing of the output packet using their respective security processing. If the packet is not dropped or blocked based upon this respective security processing, each of the security tools 112, 114, and 116 then communicates a return packet based upon the original input packet 104A back to the packet forwarding system 210 as represented by packet communications 212, 214, and 216. It is noted that the order of this parallel packet return 224 will depend upon the individual processing latencies 252, 254, and 256 for the security tools 112, 114, and 116. The example embodiment 250 assumes that the latency 254 for the second security tool 114 is the shortest, that the latency 252 for the first security tool 112 is the second shortest, and that the latency 256 for the third security tool 116 is the longest. The packet forwarding system 210 tracks receipt of the returns packets. After the packet forwarding system 210 receives a return packet from each of the security tools 112, 114, and 116, the packet forwarding system 210 forwards a secure packet 106A to the packet destination 108A. The secure packet 106A can be identical to or a modified version of the original input packet 104A, and the last return packet received can also be used as the secure packet 106A to forward to the packet destination 108A. If a return packet is not received from all of the security tools 112, 114, and 116, then the packet forwarding system 210 can assume that the packet was dropped or blocked by one of the security tools as an unsafe or unsecure packet and can discard information for that packet after a timeout has occurred. The packet forwarding system 210 can also be configured to track packet modifications where one or more of the security tools 112/114/116 is configured to modify received packets. Further, as described further below, security tools can be included in multiple groups or clusters of security tools where single return packet from a group can be considered a positive security response from the group. In addition, tool ports and related return packet tracking for security tools can tracked in cascaded and/or hierarchical arrangements. Other variations can also be implemented while still taking advantage of the parallel security processing techniques described herein.

Figure 3A:
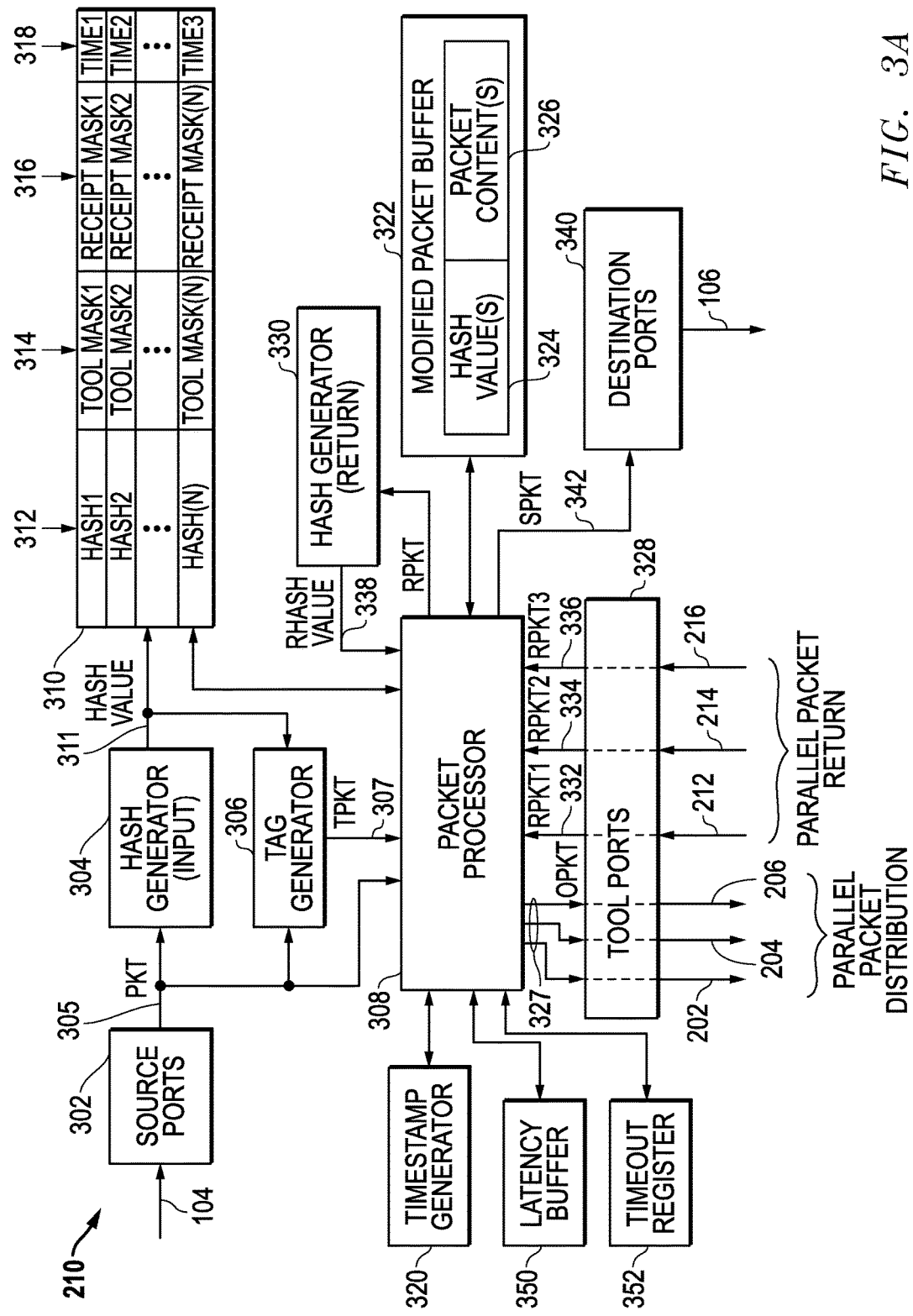
FIG. 3A is a block diagram of an example embodiment for a network packet forwarding system that is configured to have concurrent, parallel packet distribution and parallel packet return with respect to multiple security tools within a packet network communication system.

FIG. 3A is a block diagram of an example embodiment for a packet forwarding system 210 that is configured to have concurrent, parallel packet distribution and parallel packet return with respect to multiple in-line security tools 112, 114, and 116 that are being used to analyze network packets 104 within a packet network communication system. Source network packets 104 are received by source ports 302. Each input packet (PKT) 305 is then processed within the packet forwarding system 210, as described further below, to provide a common output packet (OPKT) 327 through tool ports 328 to each of the security tools 112, 114, and 116. After respective security processing, return packets (RPKT) 332, 334, and 336 are received back from the security tools 112, 114, and 116. The packet forwarding system 210 then sends a final secure packet (SPKT) 342 to destination ports 340 for delivery to a packet destination 108. It is noted that a packet is deemed secure when it has been approved or passed by each security tools 112, 114, and 116. It is assumed to not to be secure or safe if a return packet has not been received back from each of the security tools 112, 14, 116. It is also noted that one or more packet buffers can be associated with source ports 302, destination ports 340, and tool ports 328 to store incoming or outgoing network packets. It is also noted that source/tool/destination ports 302, 328, and/or 340 can include unidirectional ports or bidirectional ports or a combination of unidirectional and bidirectional ports.

Looking in more detail to FIG. 3, each incoming packet 305 is provided to and received by hash generator 304. The hash generator 304 generates a hash value 311 based upon contents of one or more fields within the packet 305, and this hash value 311 can then be used as a packet signature for the packet 305 by the packet forwarding system 210. This hash value 311 is stored in an entry within a hash table 310 along with previous hash values 312 stored in other entries for previously received packets. For the embodiment depicted, each row of hash table 310 represents an entry where information is stored for a particular input packet. The hash table 310 also stores tool masks 314, receipt masks 316, and time values 318 within the entry for each input packet. As described in more detail below, the tool masks 314 are used to select which tools will be sent a particular incoming packet, and the receipt masks 316 are used to determine which of the selected tools have sent return packets after their respective security processing. Further, the time values 318 are used to determine how much time has passed since the packets were provided to the security tools for processing, and this processing latency is used to trigger timeout events where the processing latency has passed a threshold timeout period of time.

The hash table 310 can be configured to have N entries, and these N entries can store N hash values and related tools masks 314, receipt masks 316, and time values 318 for the incoming packets. For the example embodiment of FIG. 3, these stored values are represented by hash values: HASH1, HASH2, . . . HASH(N), tool masks: TOOL MASK1, TOOL MASK2, . . . TOOL MASK(N), receipt masks: RECEIPT MASK1, RECEIPT MASK2, . . . RECEIPT MASK(N), and time values: TIME1, TIME2, . . . TIME(N). Further, the storage of hash values 312 and related tools masks 314, receipt masks 316, and time values 318 can be implemented as a cyclic buffer where, once the hash table 310 holds N hash values, a first hash value (HASH1) and/or an oldest hash value based upon the time values 318 is removed from hash table 310 each time a new hash value is received and placed in the Nth position with the other hash values being shifted up within the queue. The related entries for the tools masks 314, receipt masks 316, and time values 318 would be similarly processed along with the hash values 312. Other buffer and storage techniques could also be used while still taking advantage of the parallel security processing techniques described herein.

For embodiments where the packet forwarding system 210 is configured to track modifications made to packets by one or more of the security tools, the packet 305 is also provided to and received by a tag generator 306. For example, a security tool may be configured to modify packets to add network address translation (NAT) and/or other changes to packet contents for various reasons including security reasons. The tag generator 306 receives the hash value 311 from the hash generator 304 and tags the input packet 305 with the hash value 311 to generate a tagged packet (TPKT) 307 that is provided to the packet processor 308. The tag generator 306 can generate the tagged packet 307 using a variety of techniques including inserting the hash value 311 into a header field for the packet 305, adding a new encapsulation header to the packet 305 that includes the hash value 311, inserting the hash value 311 into one or more existing fields within the packet 305, adding a new field to the packet 305 that includes the hash value 311, and/or using one or more additional tagging techniques. The tag generator 306 could also tag the input packet 305 with other tags such as a pointer value that points to the location of hash value 311 within the hash table 310.

The packet processor 308 receives the tagged packet (TPKT) 307 or the untagged original packet (PKT) 305 depending upon whether or not packet modifications are to be tracked by the packet forwarding system 210. The packet processor 308 then provides this packet 305/307 to the tool ports 328 as an output packet (OPKT) 327 where it is then concurrently distributed in parallel to the security tools as represented by communications 202, 204, and 206. After separate security processing by each of the security tools, return packets (RPKT) are received by the tool ports 328 in parallel as represented by communications 212, 214, and 216. As each of these are received, the tool ports 328 provides the return packet (RPKT) to the packet processor 308. In particular, the first return packet (RPKT1) 332 from the first security tool is sent to the packet processor 308 when it is received; the second return packet (RPKT2) 334 from the second security tool is sent to the packet processor 308 when it is received; and the third return packet (RPKT3) 336 from the third security tool is sent to the packet processor 308 when it is received.

If one or more of the security tools is configured to potentially modify the packet, then the packet processor 308 receives a tagged packet 307 and forwards it as the output packet (OPKT) 327 for concurrent distribution to the security tools. When each return packet 332, 334, and 336 is received back from each respective security tool, the security tools leave the packet tag within the return packet 332, 334, and 336. The packet processor 308 then reads this packet tag, for example, the hash value 311 generated for the related input packet 305 or a pointer value into hash table 310. The packet processor also sends the return packet (RPKT) to a return hash generator 330, and the return hash generator 330 generates a return hash value (RHASH VALUE) 338 that is provided back to the packet processor 308. The packet processor 308 compares this return hash value 338 to the hash value tag. If they match, the return packet (RPKT) is considered not to have been modified. If they do not match, the return packet (RPKT) is considered to have been modified. Any modified return packets are then stored in the modified packet buffer 322, which stores hash value(s) 324 and related packet content(s) 326 for each modified packet that is stored. The packet processor 308 then uses the packet tag (e.g., packet hash value 311 or pointer into hash table 310) to identify matching hash values within the hash table 310. When a match is found, the related receipt mask 316 for that hash value 312 within hash table 310 is updated to show that a return packet has been received from the respective security tools. Once all of the return packets 332, 334, and 336 have been received back from the security tools, the packet processor 308 identifies all modified packets within the buffer 322, for example, by matching hash values. Typically, it is expected that only one security tool will be configured to modify packets. As such, the modified packet from that security tool stored in the modified packet buffer 322 is used as the final secure packet (SPKT) 342 that is sent to the destination ports 340 for distribution to a packet destination. If multiple security tools are configured to modify packets, then the packet modifications associated with multiple modified packets within the modified packet buffer 322 can be used to generate the final secure packet (SPKT) 342, and these modifications can be prioritized, if overlapping, to determine which modification is made within the final secure packet (SPKT) 342. The destination ports 340 then provides the final secure packet (SPKT) 342 as a secure packet 106 that is sent to the appropriate packet network destination 108.

If the security tools are not configured to make modifications to processed packets, then the packet processor 308 receives the untagged input packet (PKT) 305 and forwards it as the output packet (OPKT) 327. When each return packet 332, 334, and 336 is received back from each respective security tool, the return packet (RPKT) will also not be tagged. The packet processor sends each return packet (RPKT) to the return hash generator 330, and the return hash generator 330 generates a return hash value (RHASH VALUE) 338 that is provided back to the packet processor 308. The packet processor 308 compares this return hash value 338 to the hash values within the hash table 310. Preferably, the return hash generator 330 applies the same hash algorithm as applied by the input hash generate 304 so that the return hash value 338 will be identical to the hash value 311 if the return packet (RPKT) matches the input packet 305. When a match is found, the related receipt mask 316 for that hash value is updated to show that a return packet has been received from the respective security tools. Once all of the return packets 332, 334, and 336 have been received back from the security tools, the packet processor 308 uses the last return packet received from the security tools as the final secure packet (SPKT) 342 that is sent to the destination ports 340 for distribution to a packet destination 108 as a secure packet 106. It is noted that a tagged packet (TPKT) 307 could also be used where no packet modifications are being made by the security tools if generation of the return hash is desired to be avoided. In this embodiment and similar to above, the packet processor 308 uses the packet tag (e.g., packet hash value 311 or pointer into hash table 310) to identify matching hash values within the hash table 310.

The packet processor 308 can also communicate with the timestamp generator 320 to obtain a timestamp associated with the input packet 305. This timestamp can be stored as a time value 318 without the hash table 310. If a duplicate packet is received, the timestamp can be reset to the timestamp for the new duplicate packet. The packet processor 308 can also use the timestamp generator 320 to obtain timestamps for return packets 332, 334, and 336 when they are received back from the security tools 112, 114, and 116. As described further below, these return timestamps can be used to determine processing latencies for the security tools 112, 114, and 116. These processing latencies can then be stored in the latency buffer 350 and used to determine a timeout threshold that can be stored in the timeout register 352. Further, the timeout register 352 can include multiple timeout thresholds such that different timeout thresholds can be used for different security tools 112, 114, and 116. As also described further below, the packet processor 308 can use the timestamp generator 320 to obtain a current timestamp that can be compared with the time values 318 in hash table 310 to determine an elapsed time for the security processing of any particular input packet. If the elapsed time has exceeded the timeout threshold, the input packet 305 can be deemed an unsecure packet, and information for that packet stored within the hash table 310 and/or the modified packet buffer 322 can then be discarded. The timestamp generator 320 could also be used for other purposes as well.

It is noted that the hash generator 304 for input packets can be implemented as a single hash generator or can be implemented as multiple hash generators. For example, a separate hash generator can be provided for each of multiple different network input ports 302. Similarly, the hash generator 322 for return packets can be implemented as a single hash generator or can be implemented as multiple hash generators. For example, a separate hash generator can be provided for each of multiple different network tool ports 302. It is further noted that the input hash generator 304 and the return hash generator 322 can be implemented as a single hash generator that provides both input hash values 311 and return hash values 338, if desired. Other variations could also be implemented.

The hash generators 304/322 can also be configured to generate hash values based upon one or more hash algorithms that are applied to all or a portion of the contents of each packet. The hash generators 304/322 preferably apply the same hash algorithm(s) and are configured to apply hash algorithm(s) having uniform distribution characteristics such that resulting hash values are generated with even distributions across a range of possible hash values. Further, it is desirable that the hash algorithms generate different hash values for data strings that are different but similar so that similar but different data strings can be distinguished. Other considerations can also be used to select the hash algorithms. It is further noted that SHA-1, MD5, FNV (Fowler-Noll-Vo), and MurmurHash are known algorithms for generating hash values based upon selected input parameters. It is further noted that large cryptographic hash algorithms, such as MD5, may be difficult to utilize for the embodiments described herein because they tend to be complex and slow algorithms. It is also noted that PRBS (pseudo-random binary sequence), CRC (cyclic redundancy check), and other cyclical polynomial computations (e.g., Reed Solomon) could also be utilized to generate hash values. While these cyclical polynomial computations can be easier to implement in hardware, they typically provide worse performance with respect to desirable hash parameters. Non-cryptographic hash algorithms can also be used to provide hash values. If desired, a non-cryptographic MurmurHash-type hash algorithm can be used and can be split into multiple 16-bit hash processes that execute in parallel followed by a final series of mixing steps. Other variations, hash algorithms, and combinations of has algorithms can also be implemented while still taking advantage of the parallel security processing techniques described herein.

It is further noted that the packet processor 308, the timestamp generator 320, the hash generators 304/322, and/or tag generator 306 can be implemented using one or more programmable integrated circuits programmed to perform the operations and functions described herein, and the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). In addition, the hash table 310 can be implemented as one or more data structures stored in any desired non-transitory tangible computer-readable medium including, for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. As described further below, the packet forwarding system 210 and/or one or more of its components can also be implemented as one or more virtual machine (VM) platforms operating within a virtual processing environment hosted by one or more host processing systems. Other implementations could also be used while still taking advantage of the parallel security processing techniques described herein.

Figure 3B:
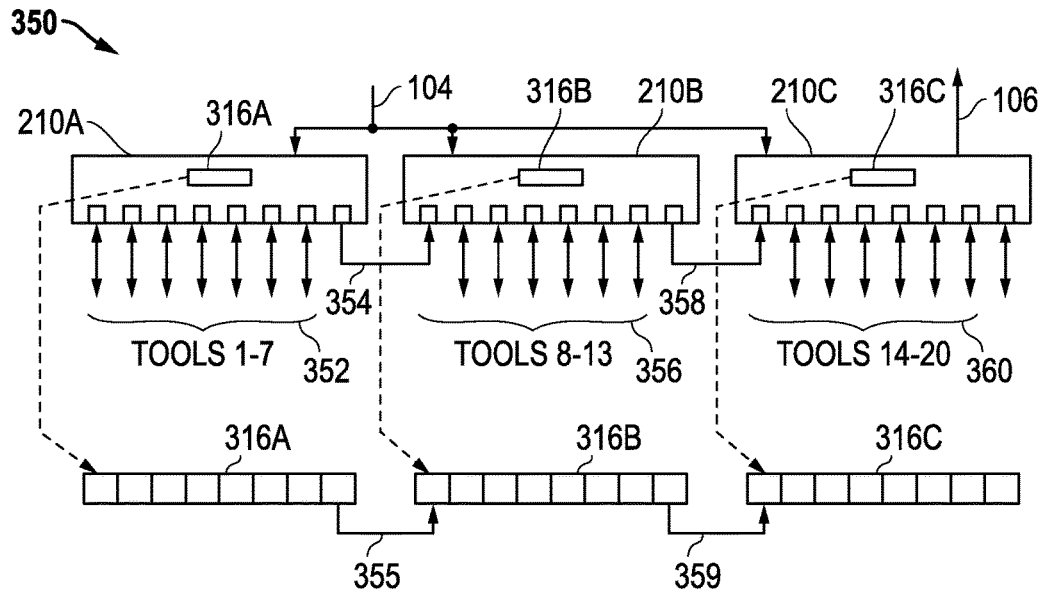
FIG. 3B is a block diagram of an example embodiment where multiple sets of packet forwarding systems are cascaded together to provide an extended number of tool ports for multiple groups of security tools.

FIG. 3B is a block diagram of an example embodiment 350 where multiple sets of packet forwarding systems 210A, 210B, and 210C are cascaded together to provide an extended number of tool ports for multiple groups of security tools. For example embodiment 350, each of the packet forwarding systems 210A, 210B, and 210C receive and process the input packets 104. The first packet forwarding system 210A is coupled through input/output tool ports to a first group 352 of seven security tools (TOOLS 1-7). The second packet forwarding system 210A is coupled through input/output tool ports to a second group 356 of six security tools (TOOLS 8-13). The third packet forwarding system 210A is coupled through input/output tool ports to a second group 360 of seven security tools (TOOLS 14-20).

During operation, the receipt mask 316A for the first packet forwarding system 210A keeps track of return packets received from the first group 352 of security tools. When return packets have been received from each of these security tools in this first group 352, a return packet is communicated from a reserved port on the first packet forwarding system 210A to a reserved port on the second packet forwarding system 210B as indicted by communication 354. This return packet communication 354 effectively ties the receipt mask 316A to receipt mask 316B as indicated by arrow 355. The receipt mask 316B for the second packet forwarding system 210B keeps track of return packets received from the second group 356 of security tools. When return packets have been received from each of these security tools in this second group 356 and from the first packet forwarding system 210A through communication 354, a return packet is communicated from an additional reserved port on the second packet forwarding system 210B to a reserved port on the third packet forwarding system 210C as indicted by communication 358. This return packet communication 358 effectively ties the receipt mask 316B to receipt mask 316C as indicated by arrow 359. The receipt mask 316C for the third packet forwarding system 210C keeps track of return packets received from the third group 360 of security tools. When return packets have been received from each of these security tools in this third group 360 and from the second packet forwarding system 210B through communication 358, a final secure packet can be communicated as secure network packet 106 to an appropriate network destination.

Figure 3C:
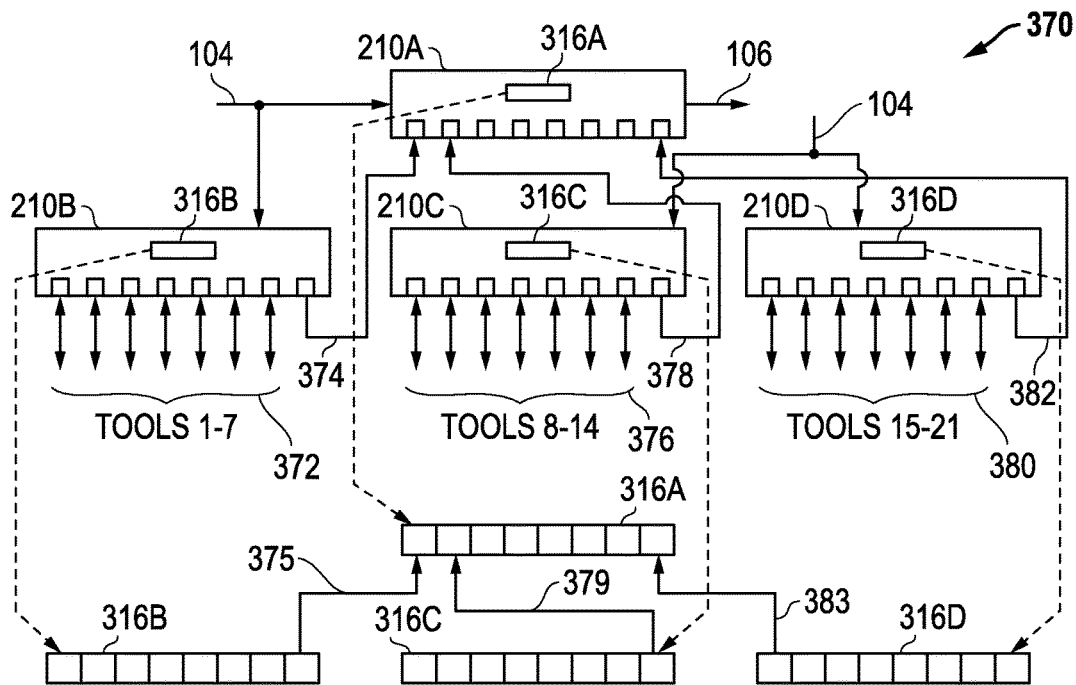
FIG. 3C is a block diagram of an example embodiment where multiple sets of packet forwarding systems are hierarchically arranged together to provide an extended number of tool ports for multiple groups of security tools.

FIG. 3C is a block diagram of an example embodiment 370 where multiple sets of packet forwarding systems 210A, 210B, 210C, and 210D are hierarchically arranged together to provide an extended number of tool ports for multiple groups of security tools. For example embodiment 370, each of the packet forwarding systems 210A, 210B, 210C, and 210D receive and process the input packets 104. The first packet forwarding system 210A is coupled through input/output tool ports to a second tier of three packet forwarding systems 210B, 210C, and 210D. The second packet forwarding system 210B is coupled through input/output tool ports to a first group 372 of seven security tools (TOOLS 1-7). The third packet forwarding system 210C is coupled through input/output tool ports to a second group 376 of seven security tools (TOOLS 8-14). The fourth packet forwarding system 210D is coupled through input/output tool ports to a third group 380 of seven security tools (TOOLS 15-21).

During operation, the receipt mask 316A for the first packet forwarding system 210A keeps track of return packets received from the other packet forwarding systems 210B, 210C, and 210D. The receipt mask 316B for the second packet forwarding system 210B keeps track of return packets received from the first group 372 of security tools. When return packets have been received from each of these security tools in this first group 372, a return packet is communicated from a reserved port on the second packet forwarding system 210A to a reserved port on the first packet forwarding system 210A as indicted by communication 374. This return packet communication 374 effectively ties the receipt mask 316B to receipt mask 316A as indicated by arrow 375. The receipt mask 316C for the third packet forwarding system 210C keeps track of return packets received from the second group 376 of security tools. When return packets have been received from each of these security tools in this second group 376, a return packet is communicated from a reserved port on the third packet forwarding system 210C to a reserved port on the first packet forwarding system 210A as indicted by communication 378. This return packet communication 378 effectively ties the receipt mask 316C to receipt mask 316A as indicated by arrow 379. The receipt mask 316D for the fourth packet forwarding system 210D keeps track of return packets received from the third group 380 of security tools. When return packets have been received from each of these security tools in this third group 380, a return packet is communicated from a reserved port on the fourth packet forwarding system 210D to a reserved port on the first packet forwarding system 210A as indicted by communication 382. This return packet communication 382 effectively ties the receipt mask 316D to receipt mask 316A as indicated by arrow 383. When the first packet forwarding system 210A has received return packets from each of the second tier security tools 210B, 210C, and 210D, a final secure packet can be communicated as secure network packet 106 to an appropriate network destination.

It is noted that the embodiments of FIGS. 3B and 3C are useful, for example, where limited numbers of ports can be combined into a single packet forwarding system. For example, where FPGAs are used to implement that packet forwarding systems 210, each FPGA can be limited in the number of ports it can effectively handle. Thus, FIGS. 3B and 3C provide cascade and hierarchical techniques to combine ports from multiple FPGAs in order to provide large effective port numbers. Further, these cascade and hierarchical techniques can be combined and mixed in a wide variety of topologies and architectures to achieve desire port expansion embodiments.

Figure 3D:
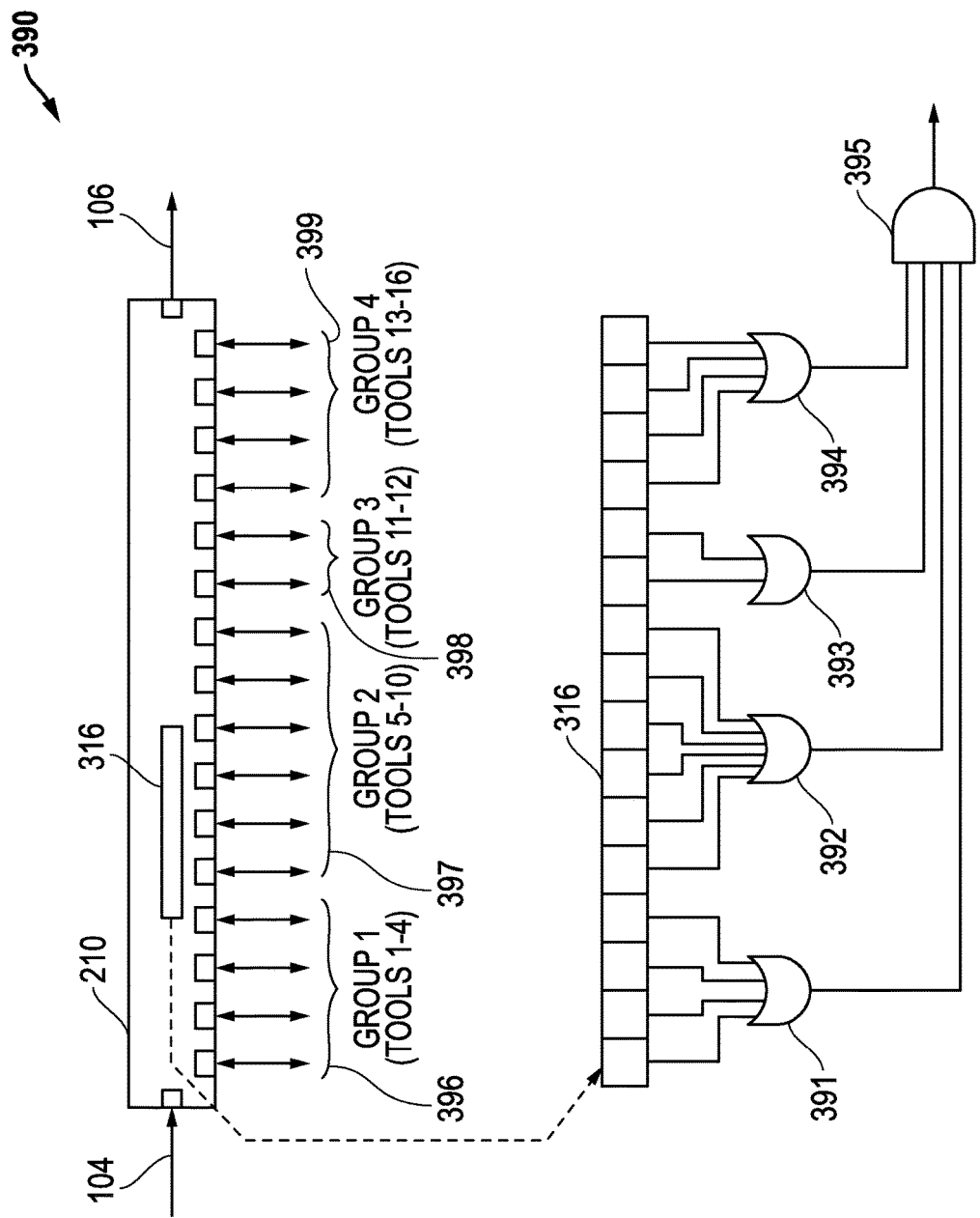
FIG. 3D is a block diagram of an example embodiment for where security tools have been grouped into different groups of security tools.

FIG. 3D is a block diagram of an example embodiment 390 for where security tools have been grouped into different groups of security tools. For example embodiment 390, the packet forwarding systems 210 receives and processes input packets 104 and output secure packets 106. The packet forwarding system 210 is coupled through input/output tool ports to sixteen security tools separated into four different groups. The first group (GROUP1) 396 includes four security tools (TOOLS 1-4). The second group (GROUP2) 397 includes six security tools (TOOLS 5-10). The third group (GROUP3) 398 includes two security tools (TOOLS 11-12). The fourth group (GROUP4) 399 includes four security tools (TOOLS 13-16). The receipt mask 316 for the packet forwarding system 210 keeps track of return packets received from each of the security tools; however, a return packet is only needed from one of the security tools within each group before an input packet is deemed secure and then output as a secure packet 106. The four bit positions in receipt mask 316 for the first group 396 are effectively combined together through a logic OR gate operation 391 to generate an output to logic AND gate operation 395. The six bit positions in receipt mask 316 for the second group 397 are effectively combined together through a logic OR gate operation 392 to generate an output to logic AND gate operation 395. The two bit positions in receipt mask 316 for the third group 398 are effectively combined together through a logic OR gate operation 393 to generate an output to logic AND gate operation 395. The four bit positions in receipt mask 316 for the fourth group 399 are effectively combined together through a logic OR gate operation 394 to generate an output to logic AND gate operation 395. The output of the logic AND gate operation 395 then becomes a "1" when at least one return packet has been received from each for the four groups of security tools.

It is noted that the embodiment of FIG. 3D is useful, for example, where similar security tools are desired to be grouped together for security processing. For example, multiple versions of the same security tool may be desired to be organized in a group so that they collectively process packets and their packet processing can be load balanced among them. Further, one of the identical security tools within a group of security tools can be removed and/or taken offline for repairs or replacement without affecting the operation of the remaining security tools in the group. As such, security processing can continue while repairs/replacement is occurring. This grouping of security tools could also be used for out purposes, if desired, while still taking advantage of the parallel security processing techniques described herein.

Figure 4:
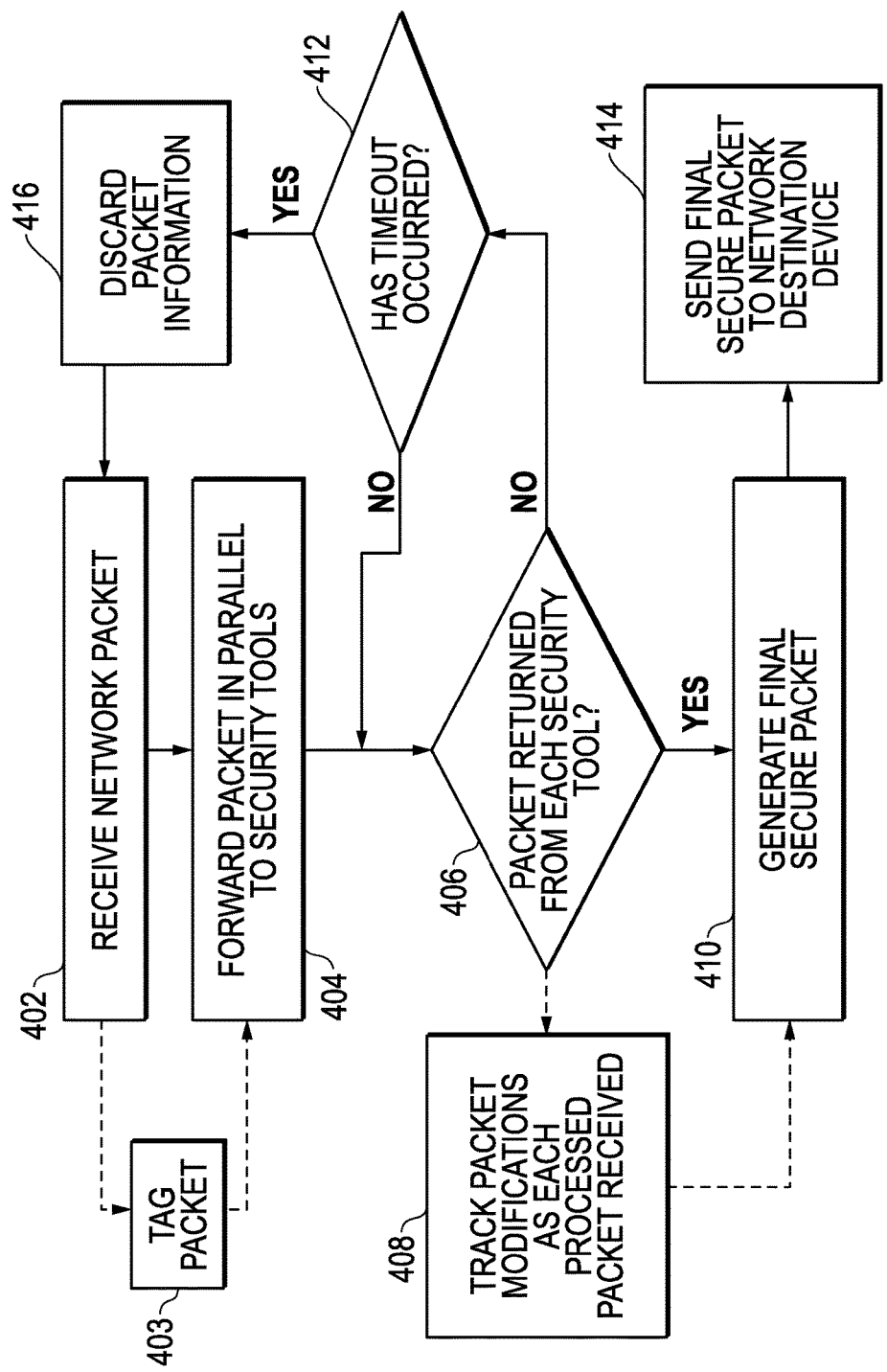
FIG. 4 is a process flow diagram of an example embodiment for concurrent distribution of incoming network packets and related processing of return packets by a packet forwarding system.

FIG. 4 is a process flow diagram of an example embodiment 400 for concurrent distribution of incoming network packets and related processing of return packets by a packet forwarding system 210. In block 402, a network packet 305 is received. As described herein, the packet is also tagged in block 403 if the packet forwarding system 210 is configured to track and manage packet modifications by the security tools. In block 404, a tagged or untagged output packet (OPKT) 327 is forwarded to the security tools in parallel. Next, in block 406, a determination is whether a return packet (RPKT) has been returned from each of the security tools. If "NO," then flow passes to block 412 where a determination is made whether a timeout has occurred, for example, where the processing time 318 for a packet has exceeded a timeout threshold value. If "NO," then flow passes back to block 406. Further, as represented block 408, if packet modifications are being tracked, these packet modifications are tracked as each return packet (RPKT) is received back from each security tool. When all return packets have been received and the determination in block 406 is "YES," block 410 is then received where a final secure packet (SPKT) 342 is generated. As described above, where packet modifications are being tracked, this final secure packet (SPKT) 342 is a combined version of the packet modifications made by the security tools to a tagged input packet (TPKT) 307. Where packet modifications are not being tracked, this final secure packet (SPKT) 342 is the last return packet (RPKT) received from the security tools. In block 414, the final secure packet (SPKT) 342 is sent to the network destination for that packet. Further, if the timeout determination in block 412 is "YES," and a timeout has occurred for an input packet 305, then flow passes to block 416 where information related to the packet is discarded from the hash table 310 as well as from the modified packet buffer 322, if packet modifications are being tracked. It is further noted that different and/or additional process flow steps could also be used while still taking advantage of the parallel security processing techniques described herein.

Figure 5A:
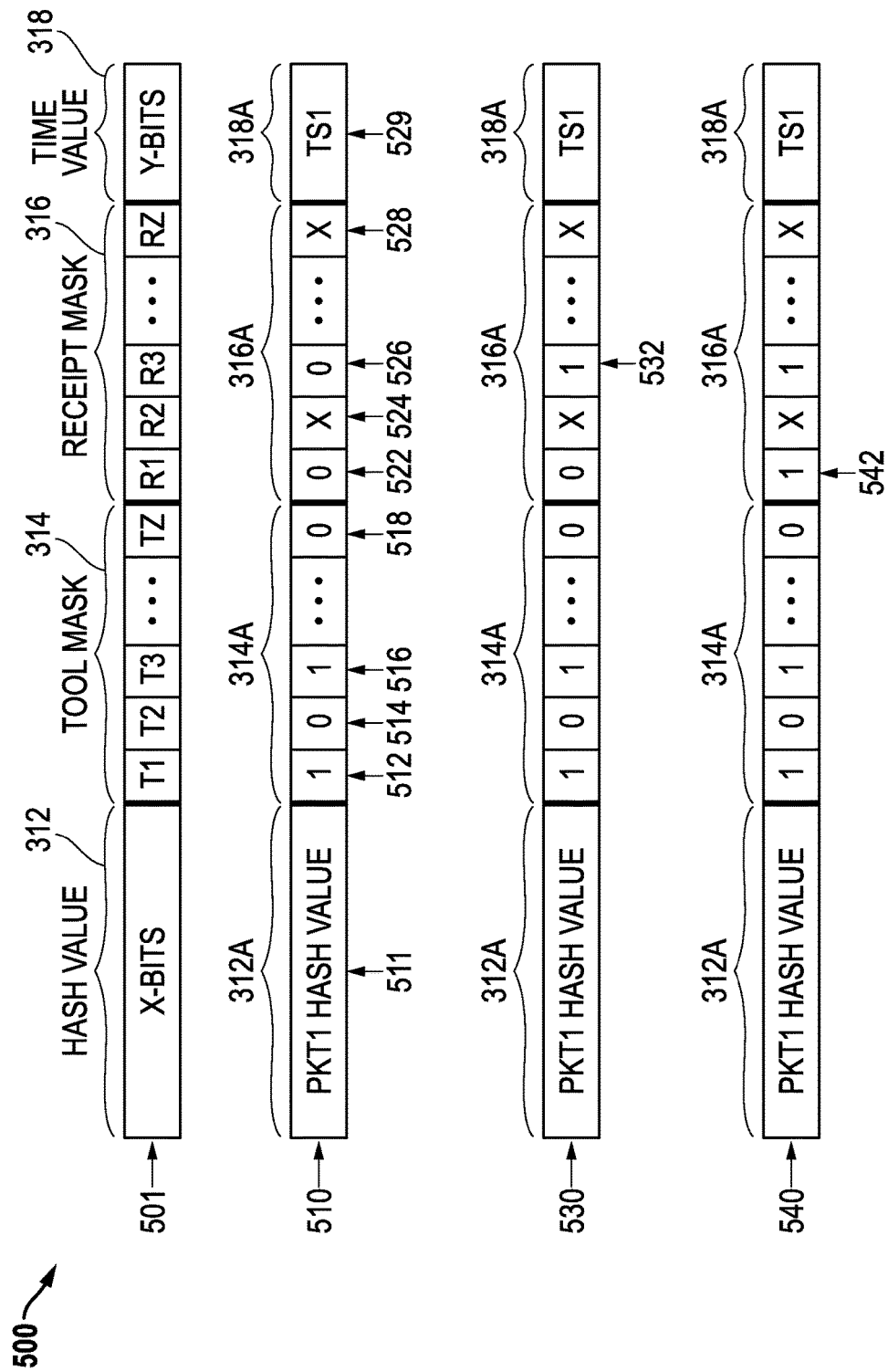
FIG. 5A is a diagram of an example embodiment for entries within the hash table including hash values, tool masks, receipt masks, and time values for input packets.

FIG. 5A is a diagram of an example embodiment 500 for entries within the hash table 310. As described above, the hash table 310 is configured to store hash values 312, tool masks 314, receipt masks 316, and time values 318 for input packets 305. Hash table entry 501 represents a generic entry for an input packet 305. The hash value 312 can be, for example, an X-bit value that is stored within the hash table for each entry. The tool mask 314 includes a bit associated with each security tool or group of security tools, and each bit is configured to identify whether or not the associated security tool or group of security tools will receive the particular input packet 305. For example, a first tool mask bit T1 identifies whether or not a first security tool will receive the input packet; a second tool mask bit T2 identifies whether or not a second security tool will receive the input packet; a third tool mask bit T3 identifies whether or not a third security tool will receive the input packet; and so on, with an Zth tool mask bit TZ identifying whether or not a first security tool will receive the input packet. The receipt mask 316 also includes a bit associated with each security tool, and each bit is configured to identify whether or not the associated security tool has sent back a return packet. For example, a first receipt mask bit R1 identifies whether or not the first security tool has sent back a return packet; a second receipt mask bit R2 identifies whether or not the second security tool has sent back a return packet; a third receipt mask bit R3 identifies whether or not the third security tool has sent back a return packet; and so on, with an Zth receipt mask bit RZ identifying whether or not the Zth security tool has sent back a return packet. The time value 318 is configured to hold a Y-bit timestamp value from the timestamp generator 320 associated with the distribution of the output packet (OPKT) 327 to the security tools. It is also noted that the bit size for the tool mask 314 and the bit size for the receipt mask 316 can be adjusted based upon the number of security tools expected to be implemented within the communication system. Non-used tool mask bits can simply be left as non-active (e.g., logic 0), and non-used receipt mask can simply be ignored by the packet forwarding system 210.

Hash table entry 510 represents an entry that has been used to store information associated with a first input packet. As indicated by arrow 511, a first packet (PKT1) hash value has been stored as the hash value 312A for the entry 510. Selection bits have also been set for the tool mask 314A for the entry 510. As indicated by arrow 512, for example, T1 has been set to "1" to indicate that the first security tool is to receive the first packet (PKT1). As indicated by arrow 514, T2 has been set to "0" to indicate that the second security tool will not receive the first packet (PKT1). As indicated by arrow 516, T3 has been set to "1" to indicate that the third security tool will receive the first packet (PKT1). The other bits within the tool mask 314A can also be set, depending upon the number of active tools, and the size of tool mask 314A. As indicated by arrow 518, TZ has been set to "0" to indicate that the Zth security tool will not receive the first packet (PKT1). As indicated by arrows 522 and 526, the corresponding receipt mask bits R1 and R3 are initialized to "0" for the two security tools selected to receive the first packet (PKT1) by tool mask bits T1 and T3. For this embodiment, a logic 0 indicates that a return packet has not yet been received. As indicated by arrows 524 and 528, the values for the receipt bits R2 and RZ are not considered as the related tool mask bits T2 and TZ indicate that any security tool associated with these bit positions will not receive the first packet (PKT1). As indicated by arrow 529, a timestamp (TS1) for the first input packet (PKT1) is stored as the time value 318A.

Hash table entry 530 represents changes that have been made to the hash table entry after a return packet has been received from the third security tool. As shown by arrow 532, the receipt mask bit R3 for the third security tool has been set to "1" to indicate that the third security tool has sent back a return packet. As described further below, the timestamp (TS1) stored as the time value 318A can be used to determine if a timeout period has lapsed for the security processing of the first packet (PKT1).

Hash table entry 540 represents changes that have been made to the hash table entry after a return packet has been received from the first security tool. As shown by arrow 542, the receipt mask bit R1 for the first security tool has been set to "1" to indicate that the first security tool has sent back a return packet. Now that all security tools selected by the tool mask 314A have sent back a return packet, a final secure packet (SPKT) 342 can be generated and sent to the destination ports 340 for distribution to a network destination 108.

It is noted that the logic values selected to indicate tool selection for the tool mask 314 and the receipt mask 316 can be modified, if desired. For example, a logic 1 could be used within the tool mask 314 to indicate that a security tool associated with a particular bit is not to receive an input packet, and a logic 0 could be used to indicate that the security tool will receive the input packet. Similarly, a logic 1 could be used within the receipt mask 316 to indicate that a security tool associated with a particular bit has not sent a return packet, and a logic 0 could be used to indicate that the security tool has sent a return packet. Multiple bits could also be allocated to each security tool for the tool mask 314 and/or the receipt mask 316. Other variations could also be implemented.

Figure 5B:
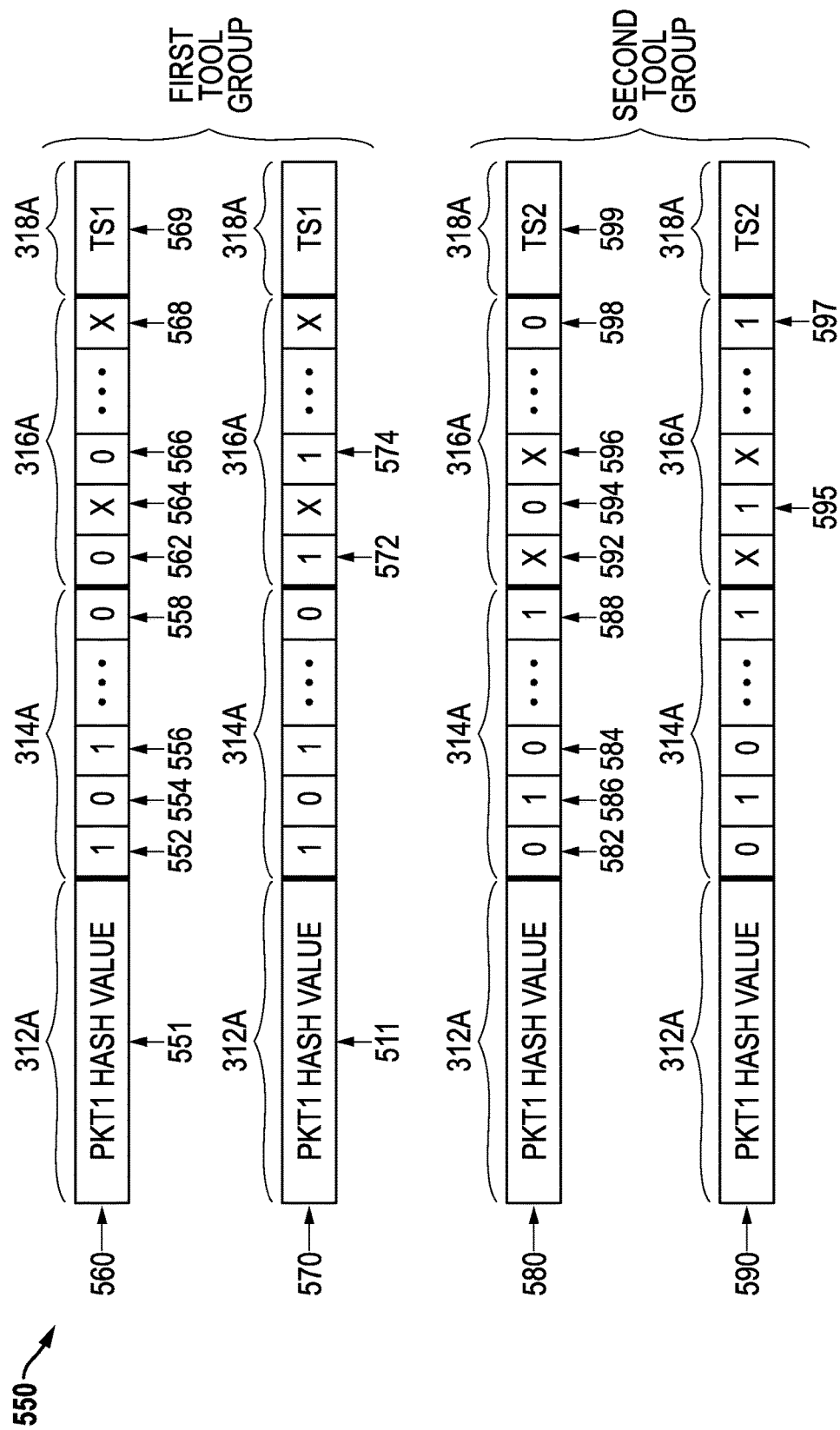
FIG. 5B is a diagram of an example embodiment for entries within the hash table where an input packet is processed through different processing tiers and related groups of multiple security tools.

FIG. 5B is a diagram of an example embodiment 550 for entries within the hash table 310 wherein an input packet is processed through different processing tiers and related groups of multiple security tools. For embodiment 550, it is assumed that security tools have been separated into two groups. Hash table entries 560 and 570 are associated with security processing by a first group of security tools which are associated with the first (T1) and third (T3) bit positions within the tool mask 314A. Hash table entries 580 and 590 are associated with security processing by a second group of security tools which are associated with the second (T2) and Zth (TZ) bit positions within the tool mask 314A.

Hash table entry 560 represents an entry that has been used to store information associated with a first input packet. As indicated by arrow 551, a first packet (PKT1) hash value has been stored as the hash value 312A for the entry 560. Selection bits for the first group have also been set for the tool mask 314A for the entry 560. As indicated by arrow 552, for example, T1 has been set to "1" to indicate that the first security tool is to receive the first packet (PKT1). As indicated by arrow 554, T2 has been set to "0" to indicate that the second security tool will not receive the first packet (PKT1). As indicated by arrow 556, T3 has been set to "1" to indicate that the third security tool will receive the first packet (PKT1). The other bits within the tool mask 314A can also be set, depending upon the number of active tools in the first group, and the size of tool mask 314A. As indicated by arrow 558, TZ has been set to "0" to indicate that the Zth security tool will not receive the first packet (PKT1). As indicated by arrows 522 and 526, the corresponding receipt mask bits R1 and R3 are initialized to "0" for the two security tools selected to receive the first packet (PKT1) by tool mask bits T1 and T3. For this embodiment, a logic 0 indicates that a return packet has not yet been received. As indicated by arrows 564 and 568, the values for the receipt bits R2 and RZ are not considered for this first group security processing as the related tool mask bits T2 and TZ indicate that any security tool associated with these bit positions will not receive the first packet (PKT1) during the first group security processing. As indicated by arrow 569, a timestamp (TS1) for the first input packet (PKT1) is stored as the time value 318A.

Hash table entry 570 represents changes that have been made to the hash table entry after a return packet has been received from the first and third security tools. As shown by arrow 572, the receipt mask bit R1 for the first security tool has been set to "1" to indicate that the first security tool has sent back a return packet. As shown by arrow 574, the receipt mask bit R3 for the third security tool has been set to "1" to indicate that the third security tool has sent back a return packet. The timestamp (TS1) stored as the time value 318A can again be used to determine if a timeout period has lapsed for the security processing of the first packet (PKT1) by the first group of security tools.

Hash table entry 580 represents changes to the entry after security processing by the first tool group has completed and security processing by the second tool group is being initiated. Selection bits for the second group have now been set for the tool mask 314A. As indicated by arrow 582, for example, T1 has now been set to "0" to indicate that the first security tool will not receive the first packet (PKT1). As indicated by arrow 584, T2 has been set to "1" to indicate that the second security tool will now receive the first packet (PKT1). As indicated by arrow 586, T3 has been set to "0" to indicate that the third security tool will not receive the first packet (PKT1). The other bits within the tool mask 314A can also be set, depending upon the number of active tools in the first group, and the size of tool mask 314A. As indicated by arrow 588, TZ has been set to "1" to indicate that the Zth security tool will now receive the first packet (PKT1). As indicated by arrows 594 and 598, the corresponding receipt mask bits R2 and RZ are initialized to "0" for the two security tools selected to receive the first packet (PKT1) by tool mask bits T2 and TZ. For this embodiment, a logic 0 indicates that a return packet has not yet been received. As indicated by arrows 594 and 598, the values for the receipt bits R1 and R3 are not considered for this second group security processing as the related tool mask bits T1 and T3 indicate that any security tool associated with these bit positions will not receive the first packet (PKT1) during the second group security processing. As indicated by arrow 599, a new current timestamp (TS2) is obtained and stored as the time value 318A for the second group security processing.

Hash table entry 590 represents changes that have been made to the hash table entry after a return packet has been received from the second and Zth security tools. As shown by arrow 595, the receipt mask bit R2 for the second security tool has been set to "1" to indicate that the second security tool has sent back a return packet. As shown by arrow 597, the receipt mask bit RZ for the Zth security tool has been set to "1" to indicate that the Zth security tool has sent back a return packet. The timestamp (TS2) stored as the time value 318A can be used to determine if a timeout period has lapsed for the security processing of the first packet (PKT1) by the second group of security tools.

It is noted that this grouping of security tools and use of the tool masks 314 to control multiple tiers of processing by the security tools allows for wide flexibility in controlling routing input packets to security tools and/or loading of the security tools. In addition, this tiered processing can also be combined with the grouping described above with respect to FIG. 3D where common tools can be grouped together such that a return packet from any one will satisfy secure packet processing from the group. Other variations and combinations could also be implemented while still taking advantage of the parallel security processing techniques described herein.

Figure 6:
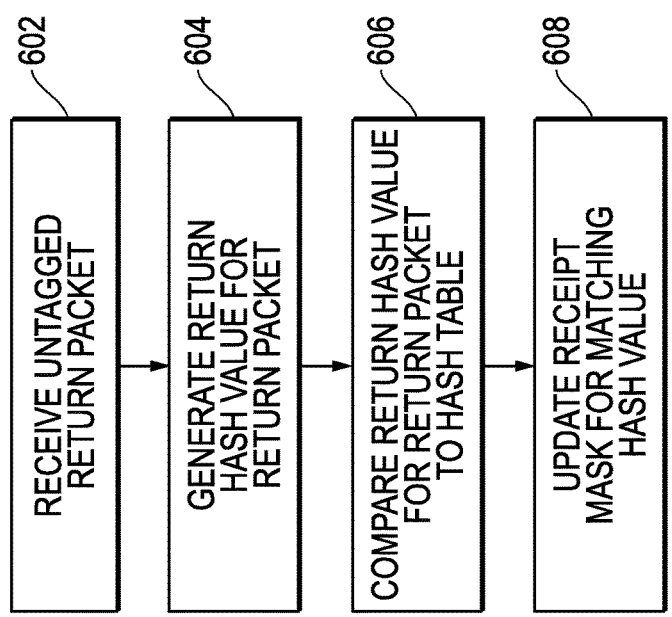
FIG. 6 is a process flow diagram of an example embodiment for updates to the receipt mask when untagged return packets are received.

FIG. 6 is a process flow diagram of an example embodiment 600 for updates to the receipt mask 316 when untagged return packets are received. In block 602, an untagged return packet is received from a security tool. In block 604, a return hash value (RHASH) 338 is generated for the return packet (RPKT). In block 606, the return hash value (RHASH) 338 is compared to entries within the hash table 310 to identify a matching hash value. In block 608, the receipt mask associated with the matching hash value is updated to indicate that a return packet has been received from the security tool that sent the return packet.

Figure 7:
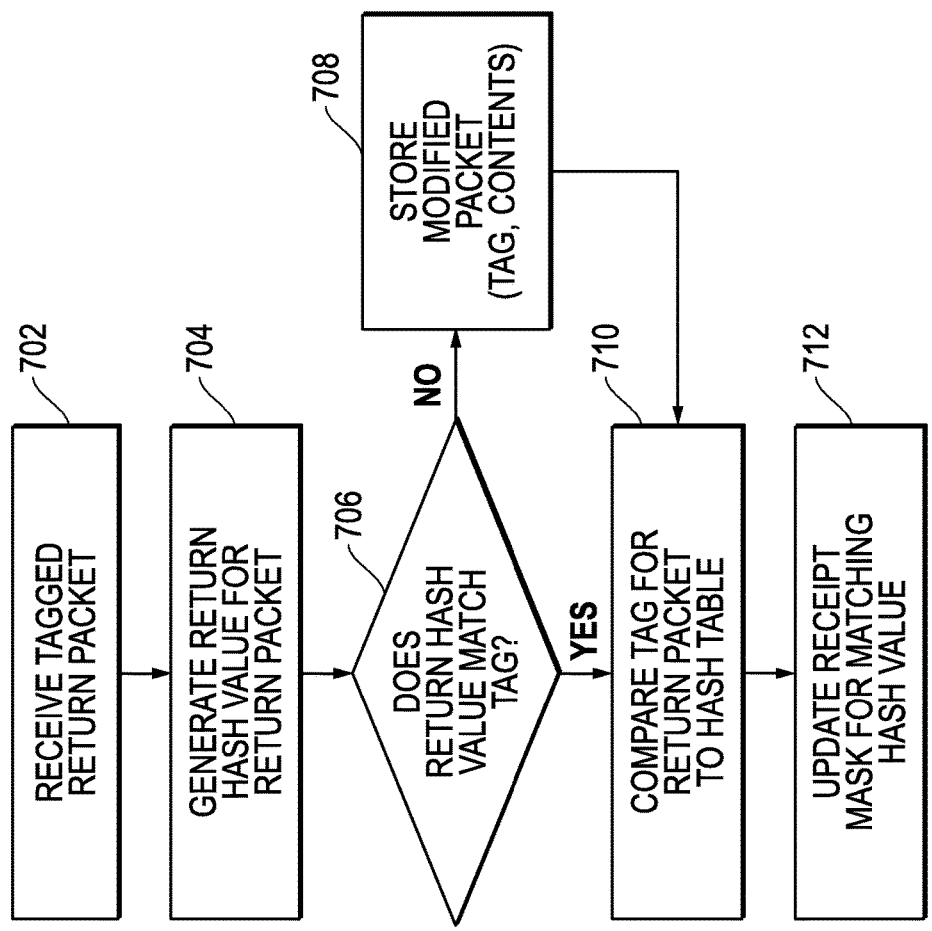
FIG. 7 is a process flow diagram of an example embodiment for updates to the receipt mask when tagged return packets are received.

FIG. 7 is a process flow diagram of an example embodiment 700 for updates to the receipt mask 316 when tagged return packets are received. It is assumed that that each tagged packet (TPKT) 307 has been tagged with the hash value 311 generated for the input packet 305 and that this hash value tag remains with the return packets. It is also noted that rather than include the hash value 311 itself, a pointer to the hash value in the hash table 310 could be used instead as the tag added to the packet to generate tagged packet (TPKT) 307. In block 702, a tagged return packet is received from a security tool. In block 704, a return hash value (RHASH) 338 is generated for the return packet. In block 706, a determination is made whether the return hash value (RHASH) 338 matches the hash value tag included within the return packet. If "YES," then block 710 is reached. If "NO," then the return packet (RPKT) is assumed to be a modified packet, and the modified packet (e.g., tag and contents) is stored in the modified packet buffer 322 in block 708. Block 710 is then reached from block 708. In block 710, the hash value tag from the tagged return packet is compared to entries within the hash table 310 to identify a matching hash value. In block 712, the receipt mask associated with the matching hash value is updated to indicate that a return packet has been received from the security tool that sent the return packet.

Figure 8:
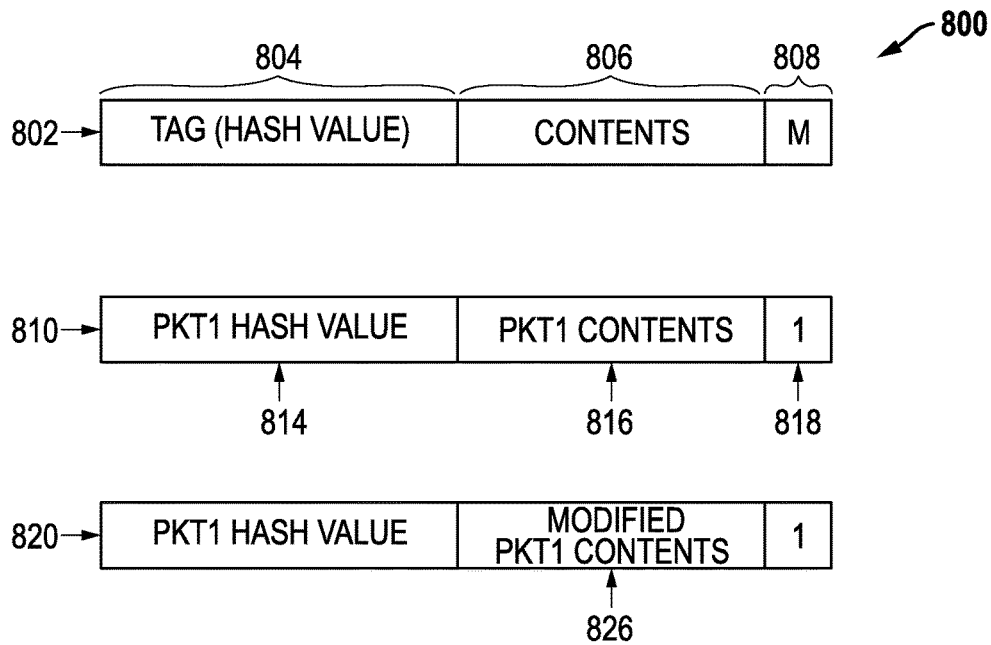
FIG. 8 is a diagram of an example embodiment for a tagged packet that is being distributed as an output packet and that includes a modify flag to indicate whether or not the packet will be modified.

FIG. 8 is a diagram of an example embodiment 800 for a tagged packet that is being distributed as an output packet (OPKT) 327 and that includes a modify flag (M) 808 to indicate whether or not the packet will be modified. Tagged packet 802 represents a generic tagged packet that includes a tag 804, packet contents 806, and a modify flag (M) 808. The tag 804 is again assumed to be the hash value 311 generated for the input packet 305. For embodiment 800, it is assumed that it is already known if the security tool will modify the tagged packet 802. As such, the packet processor 310 adjusts the modify flag 808 to mark a tagged packet 802 sent to a modifying security tool.

Tagged packet 810 represents a tagged packet associated with a first input packet (PKT1) that is to be distributed as an output packet (OPKT) 327 to a security tool that will modify the packet. As indicated by arrow 814, the hash value for the first input packet (PKT1) has been included as the tag 804. As indicated by arrow 816, contents for the first packet (PKT1) have been included as the contents 806. As indicated by arrow 818, the modify flag is initially set to "1" to indicate that the packet is expected to be modified by the security tool.

Tagged packet 820 represents a return packet (RPKT) for the first input packet that has been sent back by a security tool. As indicated by arrow 826, the contents 806 now include modified contents 826 for the first packet (PKT1). The modify flag is still set to "1" to indicate that the packet has been modified.

It is noted that the logic values selected to indicate that the packet has been modified using the modify flag (M) 808 can be modified, if desired. For example, a logic 1 could be used to indicate that a security tool has not modified the packet, and a logic 0 could be used to indicate that the security tool has modified the packet. Multiple bits could also be used for the modify flag (M) 808. Other variations could also be implemented.

Figure 9:
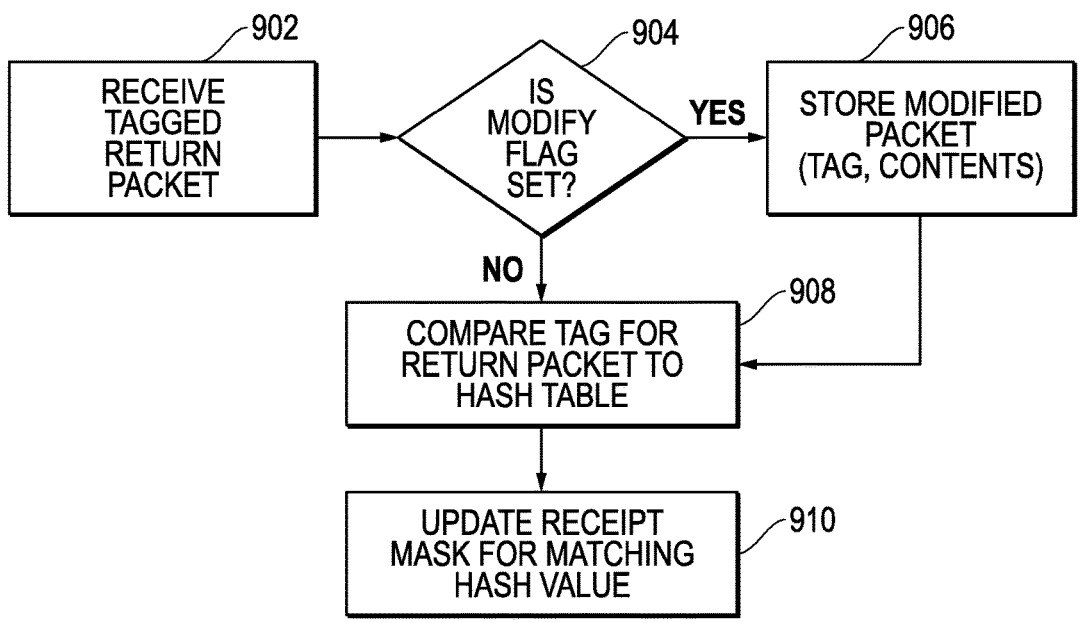
FIG. 9 is a process flow diagram of an example embodiment for updates to the receipt mask when a modify flag is being used.

FIG. 9 is a process flow diagram of an example embodiment 900 for updates to the receipt mask 316 when a modify flag (M) 808 is being used. In block 902, a tagged return packet is received from a security tool. In block 904, a determination is made whether or not the modify flag is set to indicate that the packet has been modified. If "NO," then flow passes to block 908. If "YES," then flow passes to block 906 where the modified packet (e.g., tag and contents) is stored in the modified packet buffer 322. Block 908 is then reached from block 906. In block 908, the hash value tag from the tagged return packet is compared to entries within the hash table 310 to identify a matching hash value. In block 910, the receipt mask associated with the matching hash value is updated to indicate that a return packet has been received from the security tool that sent the return packet.

Figure 10A:
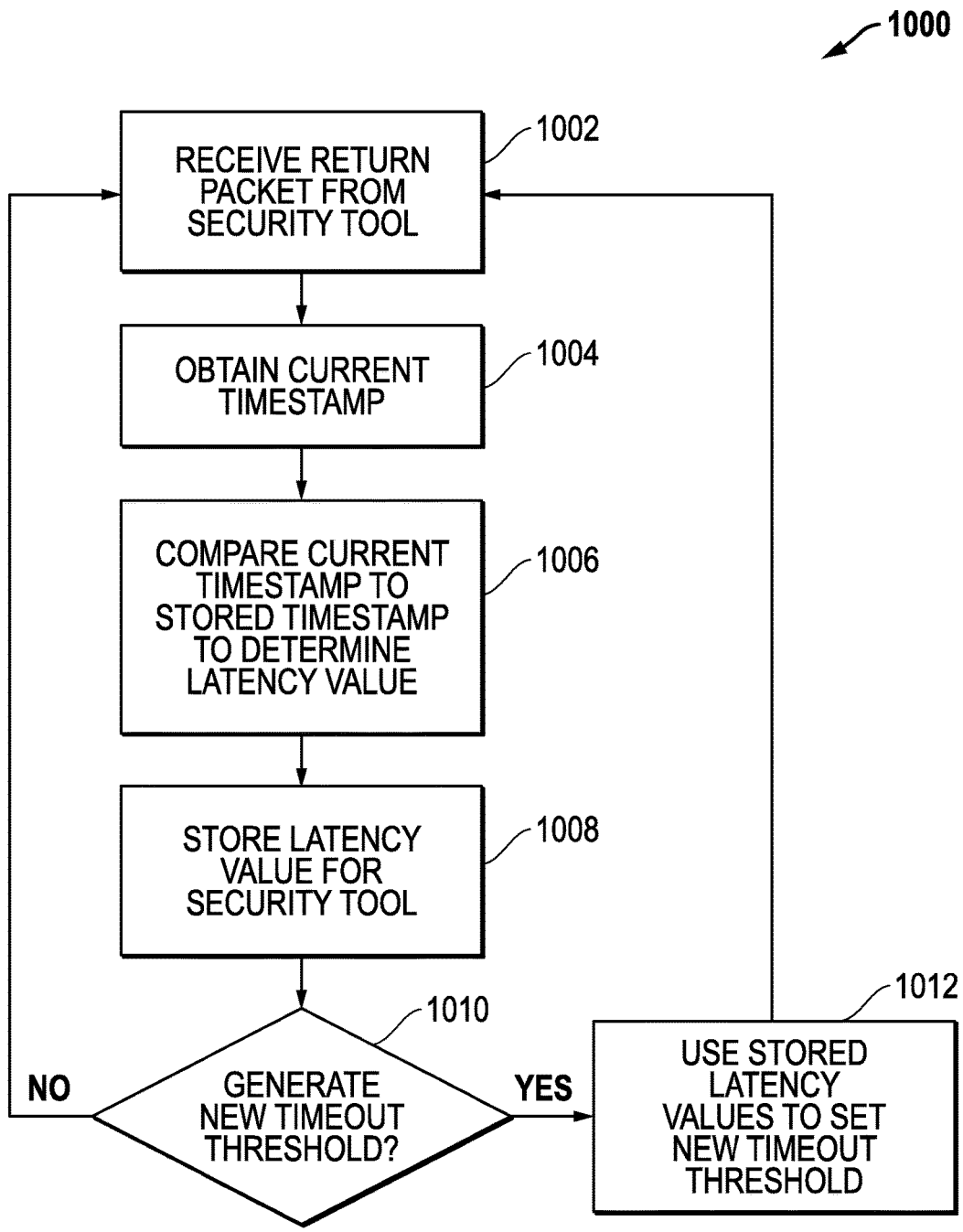
FIG. 10A is a process flow diagram on an example embodiment to use security tool processing latencies to set a timeout threshold.

FIG. 10A is a process flow diagram on an example embodiment 1000 to use security tool processing latencies to set a timeout threshold. In block 1002, a return packet (RPKT) is received from a security tool. In block 1004, a current timestamp is obtained for the receipt of the return packet (RPKT). In block 1006, the current timestamp is compared to the timestamp stored for the original input packet within the hash table 310, and a processing latency value is determined from this comparison. In block 1008, the latency value is stored for the security tool in the latency buffer 350. In block 1010, a determination is made whether or not a new timeout threshold will be generated. If "NO," then flow passes back to block 1002. If "YES," then the stored latency values are used to set a new timeout threshold 352 in block 1012. Flow then passes back to block 1002. As described above, the packet processor 308 uses the timeout threshold to determine whether a timeout has occurred for security processing for a particular input packet 305.

It is noted that a variety of techniques can be used to set the timeout threshold 352 based upon the latency values stored within the latency buffer 350. For example, the longest processing latency expected for a security tool or group of security tools can be used to set a timeout threshold. Further, processing latencies determined for multiple security tools can also be compared and used to set the timeout threshold. For example, an average latency can be determined for each of the different security tools based upon the latency values stored for each individual security tool. These average latency values can then be compared to identify the longest average latency for the different security tools. The longest average latency can then be used to set the timeout threshold 352. As one further example, it is noted that the longest average latency can be doubled to select a timeout threshold 352 that will most likely be long enough to allow the security tools to complete their processing. As another example, standard deviation determinations can be applied to the latency values and used to set the timeout threshold. As a still further example, test input packets can be generated and sent to the security tools for the purpose of determining processing latency. These test packets can be generated by the packet processor 308, and this latency testing can be conducted during periods of time when the processing bandwidth for the packet forwarding system 210 is not being fully utilized to processing network input packets 104. Other variations and techniques could also be applied while still taking advantage of the parallel distribution techniques described herein to provide security processing for network packets.

Figure 10B:
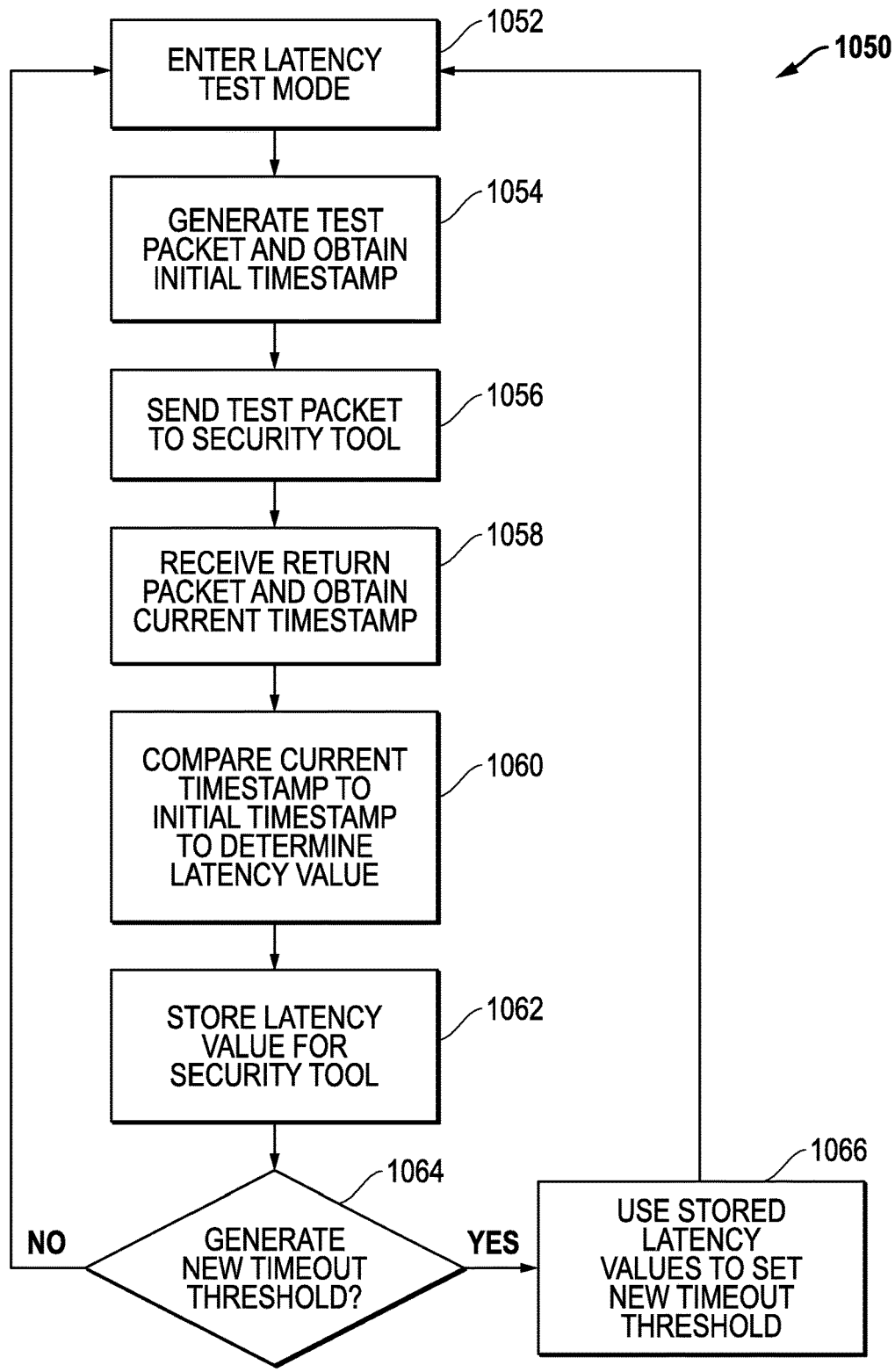
FIG. 10B is a process flow diagram on an example embodiment to use security tool processing latencies determined from test packets to set a timeout threshold.

FIG. 10B is a process flow diagram on an example embodiment 1050 to use security tool processing latencies determined from test packets to set a timeout threshold. In block 1052, a latency test mode is entered. In block 1054, a test packet is generated, and a current timestamp is obtained. In block 1056, the test packet is sent to a security tool. In block 1058, a return packet (RPKT) is received from the security tool, and a current timestamp is obtained for the receipt of the return packet (RPKT). In block 1060, the current timestamp is compared to the initial timestamp for the test packet, and a processing latency value is determined from this comparison. In block 1062, the latency value is stored for the security tool in the latency buffer 350. In block 1064, a determination is made whether or not a new timeout threshold will be generated. If "NO," then flow passes back to block 1052 where latency testing can continue or a latency test mode can be entered at a later time. If "YES," then the stored latency values are used to set a new timeout threshold in block 1066. Flow then passes back to block 1052. As described above, the packet processor 308 uses the timeout threshold to determine whether a timeout has occurred for security processing for a particular input packet 305.

As indicated above, the processing latencies can then be stored in the latency buffer 350 and used to determine one or more timeout thresholds that can be stored in the timeout register 352. For example, latency values stored in the latency buffer 350 for three different security tools 112, 114, and 116 can be used to generate different timeout thresholds for each security tool or a timeout threshold that is shared by two or more of these security tools.

TABLE 1 below provides an example embodiment where maximum processing latencies are determined for each of three different security tools 112, 114, and 116, and then these different latency values are used to set different timeout thresholds for these different security tools 112, 114, and 116.

TABLE 1

EXAMPLE INDIVIDUAL LATENCY VALUES AND TIMEOUT THRESHOLDS

| Latency Buffer 350 | | |
|---|---|---|
| Maximum Processing Latency TOOL1 | Maximum Processing Latency TOOL2 | Maximum Processing Latency TOOL3 |
| L1 | L2 | L3 |
| Timeout Register 352 | | |
| TOOL1 | TOOL2 | TOOL3 |
| L1 | L2 | L3 |

TABLE 2 below provides an example embodiment where an overall average processing latency is determined for the three different security tools 112, 114, and 116, and then this overall average processing latency is then used to set a timeout threshold for each of the different security tools 112, 114, and 116. For example, the timeout threshold can be set to a multiple of the overall average processing latency (e.g., 2-4 times or some other desired relationship).

TABLE 2

EXAMPLE OVERALL LATENCY VALUE AND TIMEOUT THRESHOLD

| Latency Buffer 350 | | |
|---|---|---|
| Average Processing Latency TOOL1 | Average Processing Latency TOOL2 | Average Processing Latency TOOL3 |
| L1 | L2 | L3 |
| Timeout Register 352 | | |
| TOOL1 | TOOL2 | TOOL3 |
| ~AVG (L1 + L2 + L3) | ~AVG (L1 + L2 + L3) | ~AVG (L1 + L2 + L3) |

It is noted that different combinations of individual and combined processing latencies can also be used, as desired, to determine timeout thresholds for security tools. It is also noted that while averages are shown in TABLE 2, non-averaged relationships can also be used. Other variations can also be implemented while still using measured processing latencies to determine one or more different timeout thresholds. As described herein, the processing latencies can also be determined using a variety of techniques including processing latencies based upon test packets, based upon return packets, and other based upon other desired measurement techniques.

Figure 11A:
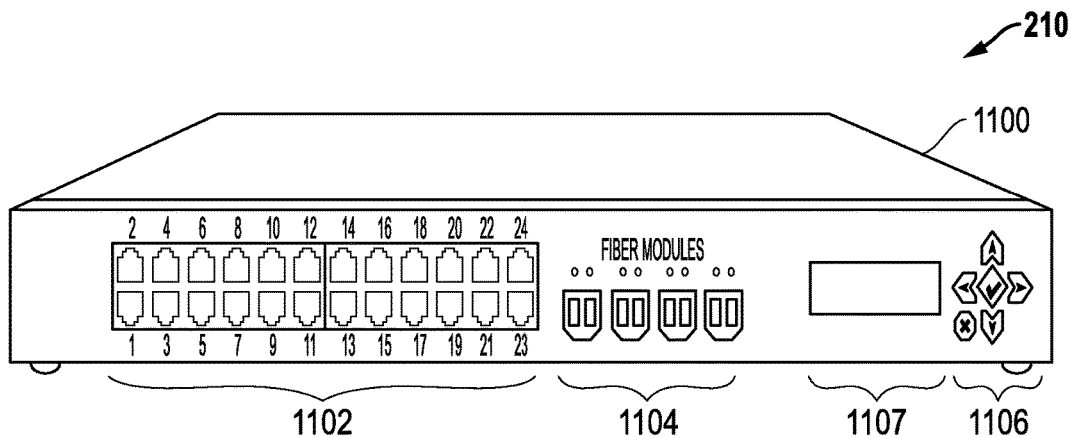
FIG. 11A is a diagram of an example embodiment for a product configuration as well as external connections for an example network packet forwarding system.

FIG. 11A is a diagram of an example embodiment for a product configuration as well as external connections for an example packet forwarding system 210. As depicted, the packet forwarding system 210 includes a housing 1100 having external connections for a variety of connector types. For example, Ethernet port connectors 1102 can be provided (e.g., Ethernet ports 1-24), and fiber optic connectors 1104 can be provided for fiber optic connector modules. Further, a display screen, such a back-lit LCD (liquid crystal display) screen 1107, can also be included for displaying information related to the packet forwarding system 210. Direct navigation controls 1108 can also be included, for example, for navigating management menus displayed in screen 1107. Although not shown, a separate management network port can also be provided, for example, on the back of housing

1100. This management network port can provide a control and management network interface for the packet forwarding system 210. It is further noted that circuitry for the packet forwarding system 210, including PCBs and power supply circuitry, can be mounted within the housing 1100. Other variations can also be implemented while still taking advantage of the parallel security processing techniques described herein.

Figure 11B:
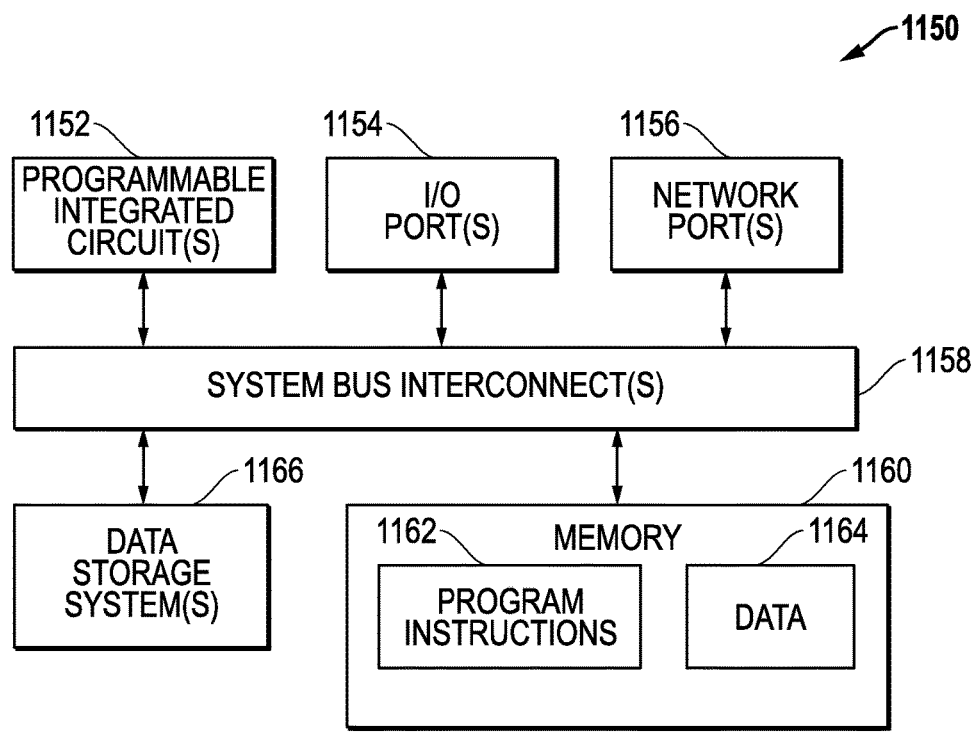
FIG. 11B is a block diagram of an example embodiment for a computing platform that can be used to implement the network packet forwarding system.

FIG. 11B is a block diagram of an example embodiment for a computing platform 1150 that can be used to implement the packet forwarding system 210. The computing platform 1150 includes one or more programmable integrated circuits 1152, one or more input/output (I/O) ports 1154, one or more network ports 1156 (e.g., source ports, tool ports, destination ports), one or more data storage systems 1160, and memory 1160 coupled to communicate with each other through a system bus interconnect 1158. The memory 1160 can include one or more memory devices that store instructions 1162 and/or data 1164 during operation of the computing platform 1150. For example, during operation, one or more of the programmable integrated circuit(s) 1152 can load software or program instructions stored in the data storage systems 1166 into the memory 1160 and then execute the software or program instructions to perform the operations and functions described herein. In addition, for operation, one or more of the integrated circuit(s) can also be programmed with code or logic instructions stored in the data storage systems 1166 to perform the operations and functions described herein. It is noted that the memory 1160 and the data storage system(s) 1166 can be implemented using any desired non-transitory tangible computer-readable medium, such as for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. It is further noted that the programmable integrated circuit(s) 1152 can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing platforms can also be implemented while still taking advantage of the parallel security processing techniques described herein.

Figure 12A:
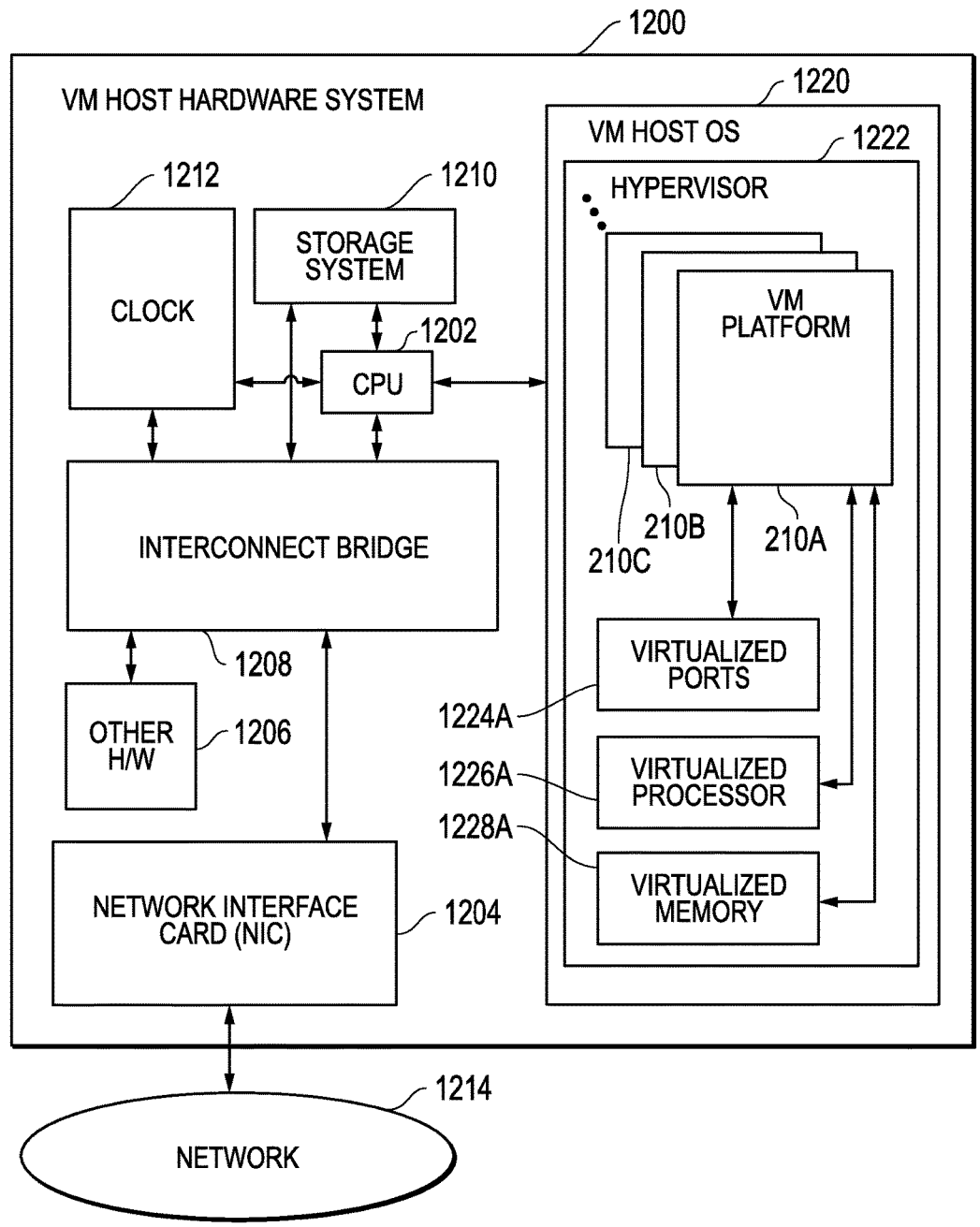
FIG. 12A is a block diagram of an example embodiment for a virtual machine host hardware system that communicates with a network such as a packet network communication system.
Figure 12B:
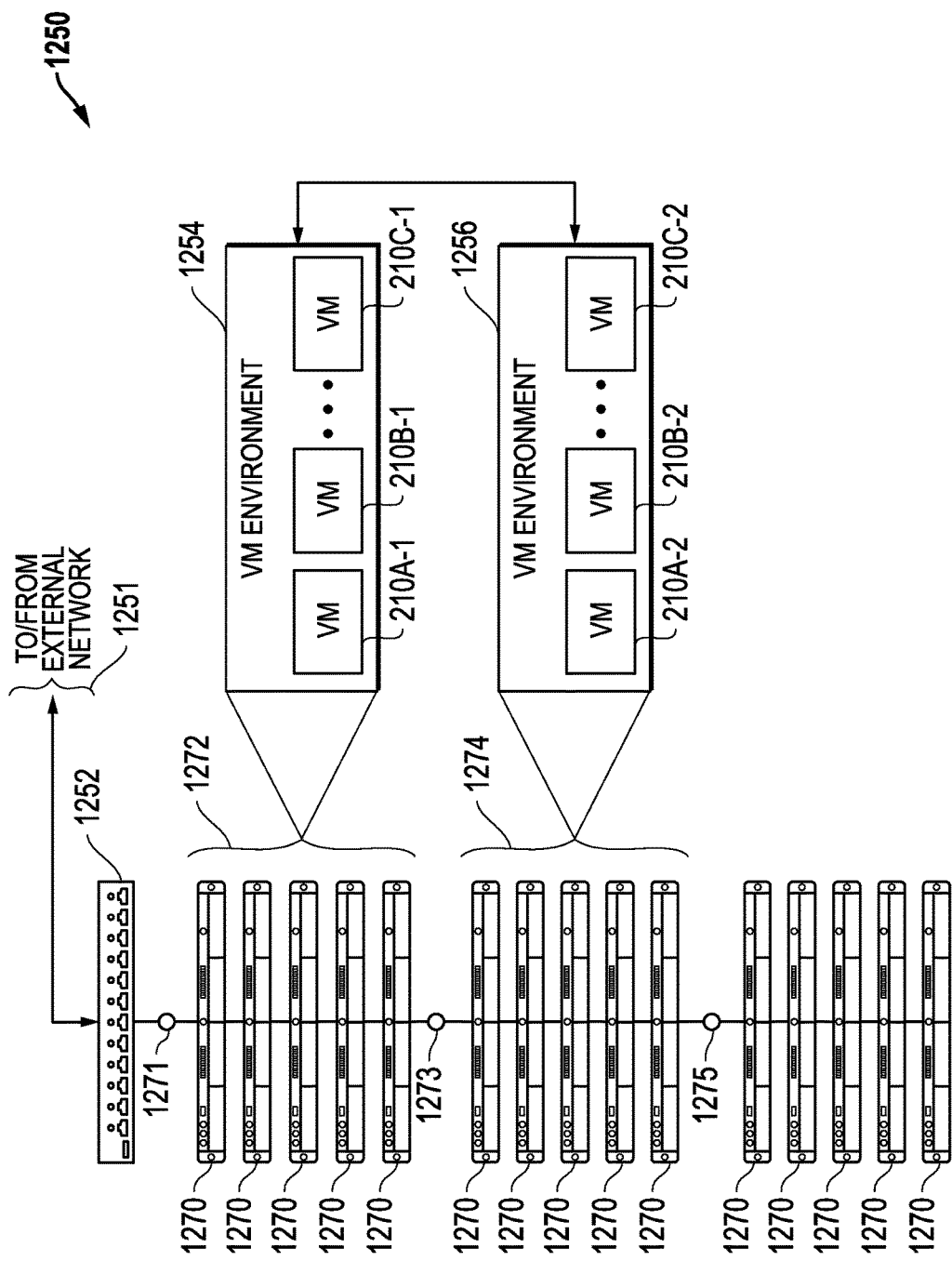
FIG. 12B is a block diagram of an example embodiment for a server system including multiple VM environments that host VM platforms implementing network packet forwarding systems.

Further, as indicated above, the packet forwarding system can also be implemented as one or more virtual machine (VM) platforms within a virtual processing environment hosted by one or more host processing systems. FIGS. 12A-B provide example embodiments of virtual environments. For example, one or more of the components within the embodiment 200 of FIG. 2 can be virtualized such that they operate as one or more VM platforms within a virtual environment. Virtual resources can be made available, for example, through processors and/or processing cores associated with one or more server processing systems or platforms (e.g., server blades) used to provide software processing instances or VM platforms within a server processing system. A virtual machine (VM) platform is an emulation of a processing system that is created within software being executed on a VM host hardware system. By creating VM platforms within a VM host hardware system, the processing resources of that VM host hardware system become virtualized for use within the network communication system. The VM platforms can be configured to perform desired functions that emulate one or more processing systems.

FIG. 12A is a block diagram of an example embodiment for a virtual machine (VM) host hardware system 1200 that communicates with a network 1214 such as a packet network communication system. For the example embodiment depicted, the VM host hardware system 1200 includes a central processing unit (CPU) 1202 (or one or more other programmable integrated circuits) that runs a VM host operating system 1220. An interconnect bridge 1208 couples the CPU 1202 to additional circuitry within the VM host hardware system 1200. For example, a system clock 1212, a network interface card (NIC) 1204, a data storage system 1210 (e.g., memory) and other hardware (H/W) 1206 are coupled to the CPU 1202 through the interconnect bridge 1208. The system clock 1212 and the storage system 1210 can also have a direct connections to the CPU 1202. Other hardware elements and variations can also be provided.

The VM host hardware system 1200 also includes a hypervisor 1222 that executes on top of the VM host operating system (OS) 1220. This hypervisor 1222 provides a virtualization layer including one or more VM platforms that emulate processing systems, such as the packet forwarding systems described above, and that provide related processing resources. As shown with respect to VM platform that implements a first packet forwarding system 210A, each of the VM platforms 210A, 210B, 210C . . . is configured to have one or more virtual hardware resources associated with it, such as virtualized ports 1224A, a virtualized processor 1226A, virtualized memory 1228A, and/or other virtualized resources. The VM host hardware system 1200 hosts each of the VM platforms 210A, 210B, 210C . . . and makes their processing resources and results available to the network 1218 through the VM host operating system 1220 and the hypervisor 1222. As such, the hypervisor 1222 provides a management and control virtualization interface layer for the VM platforms 210A-C. It is further noted that the VM host operating system 1220, the hypervisor 1222, the VM platforms 210A-C, and the virtualized hardware resources 1224A/1226A/1228A can be implemented, for example, using computer-readable instructions stored in a non-transitory data storage medium that are executed by or used to program one or more programmable integrated circuits, such as the CPU 1202, so that they are programmed to perform the operations and functions for the VM host hardware system 1200.

FIG. 12B is a block diagram of an example embodiment for a server system 1250 including multiple VM environments 1254 and 1274 that host VM platforms implementing packet forwarding systems. For the example embodiment 1250, a number of processing system platforms 1270, such as blade servers that include VM host hardware systems 1200 of FIG. 12A, are connected to an external network communication system through connections 1251 and to each other through a router or switch 1252. For the example embodiment 1250, the processing system platforms 1270 are configured into three nominal groups as indicated by nodes 1271, 1273, and 1275. The processing system platforms 1270 within each group are managed together to provide virtual processing resources as part of the network communication system. For the example embodiment 1250, one group 1272 of processing system platforms 1270 is used to host a VM environment 1254 that includes virtual machine (VM) platforms operating to provide packet forwarding systems 210A-1, 210B-1 . . . 210C-1, respectively. One other group 1274 of processing system platforms 1270 is used to host a VM environment 1256 that includes virtual machine (VM) platforms operating to provide packet forwarding systems 210A-2, 210B-2 . . . 210C-2, respectively. It is noted that other groupings of processing system platforms 1270 can also be used, or all of the processing system platforms 1270 can be managed individually or as a single unit.

The VM platforms 210A-1, 210B-1 . . . 210C-1 within VM environment 1254 can communicate with each other, with the other VM environment 1256, or with other processing systems or virtual environments within server system 1250 or the external network. Similarly, the VM platforms 210A-2, 210B-2 . . . 210C-2 within VM environment 1256 can communicate with each other, with the other VM environment 1254, or with other processing systems or virtual environments within server system 1250 or the external network. Further, it is noted that the processing system platforms 1270 can be connected to each other by a high-speed communication backbone. Other variations could also be implemented while still taking advantage of the source label techniques described herein.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the parallel security processing techniques described herein.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the inventions are described herein with reference to specific embodiments, various modifications and changes can be made without departing from the scope of the present inventions. Accordingly, the specification and figures are to be regarded in an illustrative rather than a restrictive sense, and such modifications are intended to be included within the scope of the present inventions. Further, any benefits, advantages, or solutions to problems that are described herein with regard to specific embodiments are not intended to be construed as a critical, required, or essential feature or element of any or all the claims.

What is claimed is:

1. A method to forward secure network packets to a plurality of network security tools coupled to a network system, comprising:
    measuring processing latencies for the plurality of network security tools;
    setting at least one timeout threshold based upon the processing latencies;
    receiving an input packet from a network source;
    generating a timestamp associated with the input packet;
    concurrently sending an output packet to the plurality of network security tools, the output packet being based upon the input packet;
    tracking return packets from the plurality of network security tools, the return packets being associated with the input packet; and
    determining whether a timeout has occurred with respect to the at least one timeout threshold based upon a difference between the timestamp and a current timestamp;
    wherein the method further includes:
        if a timeout does not occur before return packets have been received from each of the plurality of network security tools, forwarding a secure packet to a network destination, the secure packet being based upon at least one of the return packets; and
        if a timeout does occur before return packets have been received from each of the plurality of network security tools, ending the tracking of return packets for the input packet.

2. The method of claim 1, wherein the measuring processing latencies comprises forwarding one or more test packets to the plurality of network security tools.

3. The method of claim 2, wherein the measuring, for each of the plurality of network security tools, comprises:
    generating a timestamp for a test packet;
    forwarding a test packet to the network security tool;
    receiving a return test packet from the network security tool, the return test packet being based upon the test packet;
    generating a return timestamp for the return test packet; and
    determining a processing latency for the network security tool based upon a difference between the timestamp and the return timestamp.

4. The method of claim 3, further comprising repeating the measuring a plurality of times to generate a plurality of processing latencies for each network security tool, and using the plurality of processing latencies to set the at least one timeout threshold.

5. The method of claim 4, further comprising determining an average processing latency based upon the plurality of processing latencies and using the average processing latency to set the at least one timeout threshold.

6. The method of claim 3, further comprising setting a different timeout threshold for each of the network security tools based upon the processing latencies.

7. The method of claim 1, further comprising generating a hash value based upon the input packet and storing the timestamp and the hash value in an entry for the input packet within a hash table.

8. The method of claim 7, further comprising generating a return hash value for each return packet and comparing the return hash value to the hash table to obtain the timestamp for the input packet.

9. The method of claim 8, further comprising generating a return timestamp for each return packet and using a difference between the timestamp and the return timestamp to determine a processing latency for each return packet.

10. The method of claim 9, further comprising setting the at least one timeout threshold based upon processing latencies for a plurality of return packets.

11. The method of claim 10, further comprising setting a different timeout threshold for each of the network security tools.

12. A network system to forward secure network packets to a plurality of network security tools coupled to the network system, comprising:
 a source port configured to receive an input packet from a network source;
 a plurality of tool ports configured to transmit an output packet to a plurality of network security tools and to receive return packets from the plurality of network security tools, the output packet being based upon the input packet and the return packets being based upon the output packet;
 a destination port configured to forward a secure packet to a network destination, the secure packet being based upon at least one of the return packets;
 a timestamp generator; and
 one or more programmable integrated circuits programmed to receive the input packet through the source port;
  set at least one timeout threshold based upon processing latencies for the plurality of network security tools;
  obtain a timestamp from the timestamp generator for the input packet;
  send the output packet concurrently to the plurality of network security tools through the tool ports;
  track the return packets from the tool ports; and
  determine whether a timeout has occurred with respect to the at least one timeout threshold based upon a difference between the timestamp and a current timestamp; and
 wherein the one or more programmable integrated circuits are further programmed to
  if a timeout does not occur before return packets have been received from each of the plurality of network security tools, forward a secure packet to a network destination through the destination port, the secure packet being based upon at least one of the return packets; and
  if a timeout does occur before return packets have been received from each of the plurality of network security tools, end tracking of return packets for the input packet.

13. The network system of claim 12, wherein the one or more programmable integrated circuits are further programmed to measure processing latencies based upon test packets forwarded to the plurality of network security tools.

14. The network system of claim 13, wherein to measure processing latency for each of the plurality of network security tools, the one or more programmable integrated circuits are programmed to:
 generate a timestamp for a test packet;
 forward a test packet to the network security tool;
 receive a return test packet from the network security tool, the return test packet being based upon the test packet;
 generate a return timestamp for the return test packet; and
 determine a processing latency for the network security tool based upon a difference between the timestamp and the return timestamp.

15. The network system of claim 14, wherein the one or more programmable integrated circuits are further programmed to measure a plurality of processing latencies for each network security tool and to use the plurality of processing latencies to set the at least one timeout threshold.

16. The network system of claim 15, wherein the at least one timeout threshold is based upon an average processing latency determined from the plurality of processing latencies.

17. The network system of claim 14, wherein the one or more programmable integrated circuits are programmed to set a different timeout threshold for each of the network security tools based upon the processing latencies.

18. The network system of claim 12, further comprising a hash generator configured to generate a hash value based upon the input packet, and wherein the one or more programmable integrated circuits are programmed to store the timestamp and the hash value in an entry for the input packet within a hash table.

19. The network system of claim 18, further comprising a return hash generator configured to generate a return hash value for each return packet, and wherein the one or more programmable integrated circuits are programmed to compare the return hash value to the hash table to obtain the timestamp for the input packet.

20. The network system of claim 19, wherein the one or more programmable integrated circuits are programmed to use a difference between the timestamp and a return timestamp to determine a processing latency for each return packet.

21. The network system of claim 20, wherein the at least one timeout threshold is based upon processing latencies for a plurality of return packets.

22. The network system of claim 21, wherein one or more the programmable integrated circuits are programmed to set a different timeout threshold for each of the network security tools.

* * * * *